United States Patent
Liu et al.

(10) Patent No.: US 11,088,788 B2
(45) Date of Patent: Aug. 10, 2021

(54) EARLY PACKET LOSS DETECTION AND FEEDBACK

(71) Applicant: VID SCALE, INC, Wilmington, DE (US)

(72) Inventors: Weimin Liu, Chatham, NJ (US); Rahul Vanam, San Diego, CA (US); Liangping Ma, San Diego, CA (US); Yuriy Reznik, Seattle, WA (US); Gregory S. Sternberg, Mt. Laurel, NJ (US); Wei Chen, San Diego, CA (US); Dharm Veer, San Diego, CA (US)

(73) Assignee: VID SCALE, Inc., Wilmington, DE (US)

( * ) Notice: Subject to any disclaimer, the term of this patent is extended or adjusted under 35 U.S.C. 154(b) by 0 days.

(21) Appl. No.: 14/781,183

(22) PCT Filed: Mar. 28, 2014

(86) PCT No.: PCT/US2014/032157
§ 371 (c)(1),
(2) Date: Sep. 29, 2015

(87) PCT Pub. No.: WO2014/160926
PCT Pub. Date: Oct. 2, 2014

(65) Prior Publication Data
US 2016/0056927 A1 Feb. 25, 2016

Related U.S. Application Data

(60) Provisional application No. 61/943,073, filed on Feb. 21, 2014, provisional application No. 61/833,865, (Continued)

(51) Int. Cl.
*H04L 1/18* (2006.01)
*H04W 28/04* (2009.01)
(Continued)

(52) U.S. Cl.
CPC .............. *H04L 1/1887* (2013.01); *H04L 1/18* (2013.01); *H04L 43/0847* (2013.01);
(Continued)

(58) Field of Classification Search
None
See application file for complete search history.

(56) References Cited

U.S. PATENT DOCUMENTS 6,434,169 B1 * 8/2002 Verreault ................ H04L 29/06
370/401
6,546,001 B1 * 4/2003 Semper ................ H04L 1/1664
370/349
(Continued)

FOREIGN PATENT DOCUMENTS

CN 1976321 A 6/2007
CN 101286825 A 10/2008
(Continued)

OTHER PUBLICATIONS

JP 2008-104018 A, Cited in Office Action dated Aug. 30, 2016, issued in related Japanese application No. 2016-505584.
(Continued)

*Primary Examiner* — Ayaz R Sheikh
*Assistant Examiner* — Faiyazkhan Ghafoerkhan
(74) *Attorney, Agent, or Firm* — Condo Roccia Koptiw LLP

(57) ABSTRACT

A video encoding device (e.g., a wireless transmit/receive unit (WTRU)) may transmit an encoded frame with a frame sequence number using a transmission protocol. The video encoding device, an application on the video encoding device, and/or a protocol layer on the encoding device may detect a packet loss by receiving an error notification. The packet loss may be detected at the MAC layer. The packet loss may be signaled using spoofed packets, such as a
(Continued)

spoofed NACK packet, a spoofed XR packet, or a spoofed ACK packet. A lost packet may be retransmitted at the MAC layer (e.g., by the encoding device or another device on the wireless path). Packet loss detection may be performed in uplink operations and/or downlink operations, and/or may be performed in video gaining applications via the cloud. The video encoding device may generate and send a second encoded frame based on the error notification.

19 Claims, 18 Drawing Sheets

Related U.S. Application Data filed on Jun. 11, 2013, provisional application No. 61/806,670, filed on Mar. 29, 2013.

(51) Int. Cl.

| | | |
|---|---|---|
| H04N 19/164 | (2014.01) | |
| H04N 21/6437 | (2011.01) | |
| H04N 19/107 | (2014.01) | |
| H04N 21/647 | (2011.01) | |
| H04N 19/105 | (2014.01) | |
| H04N 19/172 | (2014.01) | |
| H04L 12/801 | (2013.01) | |
| H04L 12/911 | (2013.01) | |
| H04L 12/863 | (2013.01) | |
| H04L 12/26 | (2006.01) | |

(52) U.S. Cl.
CPC .............. *H04L 47/14* (2013.01); *H04L 47/54* (2013.01); *H04L 47/746* (2013.01); *H04N 19/105* (2014.11); *H04N 19/107* (2014.11); *H04N 19/164* (2014.11); *H04N 19/172* (2014.11); *H04N 21/6437* (2013.01); *H04N 21/6473* (2013.01); *H04N 21/64776* (2013.01); *H04W 28/04* (2013.01)

(56) References Cited

U.S. PATENT DOCUMENTS

| | | | | |
|---|---|---|---|---|
| 7,145,887 B1* | 12/2006 | Akgun | ................ | H04L 12/2801 370/321 |
| 7,911,954 B2 | 3/2011 | Cheng et al. | | |
| 7,965,639 B2* | 6/2011 | Deshpande | ........... | H04L 1/1825 370/236 |
| 8,300,620 B1* | 10/2012 | Sarkar | .................. | H04L 1/1809 370/349 |
| 8,953,484 B2* | 2/2015 | Oguchi | ................ | H04L 1/0015 370/252 |
| 2002/0054578 A1* | 5/2002 | Zhang | .................. | H04L 1/0001 370/328 |
| 2002/0055365 A1* | 5/2002 | Yamato | ................ | H04W 28/18 455/466 |
| 2005/0005207 A1* | 1/2005 | Herneque | ............ | H04L 47/193 714/712 |
| 2005/0022089 A1* | 1/2005 | Le | ......... | H04L 1/1867 714/749 |
| 2005/0088966 A9* | 4/2005 | Stewart | .................. | H04L 12/66 370/218 |
| 2006/0203729 A1* | 9/2006 | Deshpande | ............... | H04L 1/24 370/235 |
| 2007/0041385 A1 | 2/2007 | Sali et al. | | |
| 2007/0091816 A1* | 4/2007 | Lee | .................... | H04N 21/6473 370/252 |
| 2008/0176517 A1* | 7/2008 | Lee | ..................... | H04N 19/895 455/63.1 |
| 2008/0224889 A1* | 9/2008 | Wyk | ..................... | H04L 45/127 340/870.01 |
| 2008/0273554 A1* | 11/2008 | Shao | .................... | H04N 21/6375 370/498 |
| 2008/0281961 A1* | 11/2008 | Niemczyk | ............. | H04L 43/045 709/224 |
| 2008/0298322 A1* | 12/2008 | Chun | .................... | H04L 1/1635 370/335 |
| 2009/0034610 A1* | 2/2009 | Lee | .................... | H04N 21/6175 375/240.02 |
| 2010/0121957 A1* | 5/2010 | Roy | .................... | H04L 63/1466 709/227 |
| 2010/0146355 A1 | 6/2010 | Jiang et al. | | |
| 2010/0188969 A1* | 7/2010 | Kim | ....................... | H04L 1/1887 370/216 |
| 2010/0296431 A1* | 11/2010 | Terry | .................... | H04W 88/04 370/315 |
| 2010/0325507 A1* | 12/2010 | Sung | ..................... | H04L 1/1812 714/749 |
| 2011/0126069 A1* | 5/2011 | Kim | ....................... | H04L 1/1893 714/748 |
| 2011/0205996 A1* | 8/2011 | Kim | ....................... | H04L 1/1812 370/329 |
| 2011/0267948 A1* | 11/2011 | Koc | ....................... | H04L 5/0064 370/235 |
| 2012/0119923 A1* | 5/2012 | Van Wyk | ............... | H04W 40/22 340/870.11 |
| 2012/0163161 A1* | 6/2012 | Zhang | .................... | H04L 1/1887 370/216 |
| 2012/0281562 A1* | 11/2012 | Holmer | ............ | H04N 21/44004 370/252 |
| 2012/0307886 A1* | 12/2012 | Agarwal | .................. | H04W 4/18 375/240.02 |
| 2013/0003579 A1* | 1/2013 | Lu | .................. | H04N 21/234327 370/252 |
| 2013/0065562 A1* | 3/2013 | Singh | .................. | G06F 3/04842 455/414.1 |
| 2013/0163455 A1* | 6/2013 | Oguchi | ................. | H04L 1/0015 370/252 |
| 2014/0079016 A1* | 3/2014 | Dai | .................... | H04W 72/0446 370/330 |
| 2014/0130111 A1* | 5/2014 | Nulty | .................. | H04L 41/0631 725/107 |
| 2016/0056927 A1* | 2/2016 | Liu | ......................... | H04L 47/54 370/216 |
| 2017/0303159 A1* | 10/2017 | Ma | .................... | H04W 28/0289 |

FOREIGN PATENT DOCUMENTS

| | | |
|---|---|---|
| CN | 102611537 A | 7/2012 |
| CN | 102959892 A | 3/2013 |
| EP | 2670077 A1 | 12/2013 |
| JP | 60-106250 A | 6/1985 |
| JP | S 60106250 A | 6/1985 |
| JP | 2008-104018 A | 5/2008 |
| JP | 2008-187305 A | 8/2008 |
| JP | 2009-513072 A | 3/2009 |
| JP | 2009-522873 A | 6/2009 |
| KR | 10-2008-0040767 A | 5/2008 |
| KR | 10-2008-0077125 A | 8/2008 |
| TW | 201301834 A | 1/2013 |
| WO | WO 2007/079085 A2 | 7/2007 |

OTHER PUBLICATIONS

JP 2008-187305 A, Cited in Office Action dated Aug. 30, 2016, issued in related Japanese application No. 2016-505584.
JP 60-106250 A, Cited in Office Action dated Aug. 30, 2016, issued in related Japanese application No. 2016-505584.
JP 2009-513072 A, US 2007/0091816 A1.
JP 2009-522873 A, WO 2007/079085 A2.
"JM Decoder", Available at http://iphome.hhi.de/suehring/tml/, Retrieved on Oct. 14, 2016, 1 page.
"Onoe", Available at http://madwifi-project.org/browser/madwifi/branches/madwifi-0.9.4/ath_rate/onoe/onoe.c, retrieved on Mar. 31, 2017, 10 pages.
"OpenMAX", Available at http://www.khronos.org/openmax, Retrieved on Oct. 14, 2016, 4 pages.

(56) References Cited

OTHER PUBLICATIONS

"Xiph.org", Available at http://media.xiph.org/video/derf/, Retrieved on Oct. 14, 2016, 19 pages.
Baugher et al., "The Secure Real-time Transport Protocol (SRTP)", Network Working Group, RFC: 3711, Mar. 2004, 50 pages.
Bianchi, Giuseppe, "Performance Analysis of the IEEE 802.11 Distributed Coordinated Function", IEEE Journal on Selected Areas in Communications, vol. 18, No. 3, Mar. 2000, pp. 535-547.
Bicket, John C., "Bit-Rate Selection in Wireless Networks", MIT Master's Thesis, Massachusetts Institute of Technology, Feb. 22, 2005, pp. 1-50.
Cisco, "Cisco Visual Networking Index: Global Mobile Data Traffic Forecast Update, 2012-2017", Availaible at http://www.cisco.com/en/US/solutions/collateral/ns341/ns525/ns537/ns705/ns827/white_paper_c11-520862.html, Feb. 6, 2013, pp. 1-34.
Conklin et al., "Video Coding for Streaming Media Delivery on the Internet", IEEE Transactions on Circuits and Systems for Video Technology, vol. 11, No. 3, Mar. 2001, pp. 269-281.
Dierks et al., "The Transport Layer Security (TLS) Protocol Version 1.2", Network Working Group, RFC: 5246, Aug. 2008, 92 pages.
Friedman et al., "RTP Control Protocol Extended Reports (RTCP XR)", Network Working Group, RFC: 3611, Nov. 2003, pp. 1-55.
Girod et al., "Feedback-Based Error Control for Mobile Video Transmission", Proceedings of the IEEE, vol. 87, No. 10, Oct. 1999, pp. 1707-1723.
Haratcherev et al., "Optimized Video Streaming over 802.11 by Cross-Layer Signaling", IEEE Communications Magazine, vol. 44, No. 1, Jan. 2006, pp. 115-121.
IEEE, "Telecommunications and Information Exchange Between Systems—Local and Metropolitan Area Networks—Specific Requirements; Part 11: Wireless LAN Medium Access Control (MAC) and Physical Layer (PHY) Specifications", IEEE Std. 802.Nov. 2012, Mar. 29, 2012, pp. 1-2793.
IEEE, "Telecommunications and Information Exchange Between Systems—Local and Metropolitan Area Networks—Specific Requirements, Part 2: Logical link Control", IEEE Standard 802.2, 1998 Edition, 1998, 253 pages.
ISO/IEC, "Information Technology—Dynamic Adaptive Streaming Over HTTP (DASH)—Part 1: Media Presentation Description and Segment Formats", ISO/IEC JTC 1/SC 29, ISO/IEC DIS 23009-1, ISO/IEC JTC 1/SC 29/WG 11, Aug. 30, 2011, 131 pages.
ITU-T, "Video Back Channel Messages for Conveyance of Status Information and Requests from a Video Receiver to a Video Sender", Series H: Audiovisual and Multimedia Systems, Infrastructure of Audiovisual Services—Coding of Moving Video, H.271, May 2006, 22 pages.
Kamerman et al., "WaveLAN II: A High-Performance Wireless LAN for the Unlicensed Band", Bell Labs Technical Journal, 1997, pp. 118-133.
Lacage et al., "IEEE 802.11 Rate Adaptation: A Practical Approach", MSWiM '04 Proceedings of the 7th ACM International Symposium on Modeling, Analysis and Simulation of Wireless and Mobile Systems, Venezia, Italy, Oct. 2004, pp. 126-134.
Lu et al., "Robust Wireless Video Streaming Using Hybrid Spatial/Temporal Retransmission", IEEE Journal on Selected Areas in Communications, vol. 28, No. 3, Apr. 2010, pp. 476-487.
Ott et al., "Extended RTP Profile for Real-time Transport Control Protocol (RTCP)-Based Feedback (RTP/AVPF)", Network Working Group, RFC: 4585, Jul. 2006, 51 pages.
Pantos et al., "HTTP Live Streaming", draft-pantos-http-live-streaming-06, Internet—Draft, Mar. 31, 2011, 25 pages.
Postel, J., "User Datagram Protocol", RFC 768, Aug. 28, 1980, 3 pages.
Sarolahti et al., "Transport-Layer Considerations for Explicit Cross-Layer Indications", draft-sarolahti-tsvwg-crosslayer-01.txt, Internet Engineering Task Force, Internet—Draft, Mar. 5, 2007, 29 pages.

Schaar et al., "Optimized Scalable Video Streaming Over IEEE 802.11a/e HCCA Wireless Network Under Delay Constraints", IEEE Trans. Mobile Computing, vol. 5, No. 6, Jun. 2006, pp. 755-768.
Schulzrinne et al., "RTP: A Transport Protocol for Real-Time Applications", Network Working Group, RFC: 1889, Jan. 1996, 66 pages.
Venkatesan et al., "IEEE 802 tutorial: video over 802.11", IEEE 802, Mar. 2007, 43 pages.
Videolan, "x264 Encoder", Available at http://www.videolan.org/developers/x264.html, Retrieved on Oct. 14, 2016, 2 pages.
Vu et al., "Collision Probability in Saturated IEEE 802.11 Networks", Australian Telecomm Networks & Appl. Conf. (ATNAC), Dec. 2006, 5 pages.
Wi-Fi, "Wi-Fi Multimedia", Available at http://www.wi-fi.org/knowledge-center/articles/wi-fi-multimedia%E2%84%A2-wmm%C2%AE, Retrieved on Mar. 31, 2017, 3 pages.
Wong et al., "Robust Rate Adaptation for 802.11 Wireless Networks", IEEE MobiCom, Los Angeles, USA, Sep. 23-26, 2006, pp. 146-157.
Xu et al., "An Access Delay Model for IEEE 802.11e EDCA", IEEE Transactions on Mobile Computing, vol. 8, No. 2, Feb. 2009, pp. 261-275.
Curcio, Igor D.D., "Mobile Video Telephony", Wireless Internet Handbook, CRC Press, Inc., 2003, 15 pages.
Devadoss et al., "Evaluation of Error Resilience Mechanisms for 3G Conversational Video", Tenth IEEE International Symposium on Multimedia, 2008, 6 pages.
European Telecommunications Standards Institute (ETSI), ETSI TS 126 234 V9.3.0, "UMTS, LTE, Transparent End-to-End Packet-Switched Streaming Service (PSS), Protocols and Codecs", Jun. 2010, 185 pages.
Jain, Anil K., "Fundamentals of Digital Image Processing", Prentice Hall Information and System Sciences Series, 1989, pp. 44-85.
Levent-Levi, T., "The Past, Present and Future of Mobile Video Telephony", Vision Mobile, Available at http://www.visionmobile.com/blog/2010/06/the-past-present-and-future-of-mobile-video-telephony/, Jun. 8, 2010, 16 pages.
Myers, David J., "Mobile Video Telephony for 3G Wireless Networks", The McGraw-Hill Companies, Inc., 2004, pp. 1-10.
Sohn et al., "Adaptive Packet-Level FEC Algorithm for Improving the Video Quality Over IEEE 802.11 Networks", International Journal of Software Engineering and Its Applications, vol. 6, No. 3, Jul. 2012, pp. 27-34.
JPS 60106250 A, Abstract and translation. Cited in Official Action dated Jan. 22, 2018 in related Chinese patent No. 201480018824.X.
CN 102959892 A, US 2012-163161 A1.
Wada, Masahiro, "Selective Recovery of Video Packet Loss Using Error Concealment", IEEE Journal on Selected Areas in Communications, vol. 7, No. 5, Jun. 1989, pp. 807-814.
TW 201301834 A, US 2012/0307886 A1 (Previously cited in Information Disclosure Statement filed on Oct. 9, 2018 in the above-identified U.S. Appl. No. 14/781,183).
CN 1976321 A, U.S. Pat. No. 7,911,954 B2.
CN 101286825 A, US 2010/0146355 A1.
CN 102611537 A, EP 2670077 A1.
ISO/IEC, "WD of ISO/IEC 23008-1 AMD2 Cross Layer Interface", ISO/IEC JTC 1/SC29, MPEG/N13612, ISO/IEC DIS 23008-1; 2013/AMD2, ISO/IEC JTC 1/SC 29/WG 11, Apr. 26, 2013, 12 pages.
ISO/IEC, "Information technology—High efficiency coding and media delivery in heterogeneous environments—Part 1: MPEG media transport (MMT)", ISO/IEC JTC 1/SC 29, ISO/IEC DIS 230081, ISO/IEC JTC 1/SC 29/WG 11, Apr. 26, 2013, 88 pages.
H. Lundin, et al. "A Google Congestion Control Algorithm for Real-Time Communication on the World Wide Web", Internet-Draft, Apr. 25, 2012, 10 pages.
Apple, Inc., "Http Live Streaming Overview", Developer, Feb. 11, 2014, 39 pages.

* cited by examiner

MMT with 4G/LTE stack

EARLY PACKET LOSS DETECTION AND FEEDBACK

CROSS REFERENCE TO RELATED APPLICATIONS

This application is the National Stage Entry under 35 U.S.C. § 371 of Patent Cooperation Treaty Application No. PCT/US14/32157, filed Mar. 28, 2014, which claims the benefit of U.S. Provisional Patent Application No. 61/806,670, filed Mar. 29, 2013, U.S. Provisional Patent Application No. 61/833,865, filed Jun. 11, 2013, and U.S. Provisional Patent Application No. 61/943,073, filed Feb. 21, 2014, the contents of which are hereby incorporated by reference herein.

BACKGROUND

In recent years, due to the introduction of devices like new generation smart phones, tablet computers etc., there has been a rapid growth in mobile multimedia traffic. These devices are endowed with advanced multimedia capabilities like video streaming, high resolution display, and the ability to support interactive applications like video conferencing and video chatting. Video now accounts for 51% of mobile traffic, and, it is predicted that mobile video will increase 16-fold, eventually accounting for two thirds of total mobile data traffic. Wireless local area networking (WLAN), which may be referred to as Wi-Fi based on IEEE 802.11 standards, for example, may be used for data delivery for both non-mobile and mobile users.

Real-time video applications may impose challenging latency requirements on wireless networks. For example, in mobile video telephony operating over WLAN links, WLAN networks may suffer from transmission errors that may result in degraded video quality.

SUMMARY OF THE INVENTION

Systems, methods, and instrumentalities are provided to implement a feedback based coding. A video encoding device (e.g., a wireless transmit/receive unit (WTRU), which may include a video phone, a tablet computer, etc.) may transmit an encoded frame with a frame sequence number using a transmission protocol (e.g., SRTP or TLS). The encoding device, an application on the video encoding device, and/or a protocol layer on the encoding device may detect a packet loss (e.g., by receiving an error notification). The packet loss may be detected by the transmission protocol. The error notification may indicate a transmission failure of the first encoded frame and may include a sequence control media access control (MAC) protocol data unit ($SC_{MPDU}$). The encoding device may derive a lost frame sequence number from the error notification. Deriving the lost frame sequence number may include mapping the $SC_{MPDU}$ to a sequence number MAC service data unit ($SN_{MSDU}$) and mapping the $SN_{MSDU}$ to a real-time transport protocol sequence number ($SN_{RTP}$). Deriving the lost frame sequence number may include mapping the $SN_{MSDU}$ to a transport layer security (TLS) signature ($ID_{TLS}$) and mapping $ID_{TLS}$ to network adaptation layer sequence number ($SN_{NAL}$) when TLS protocol is used. The lost frame sequence number may be sent to another layer via a motion pictures experts group (MPEG) media transport (MMT) cross layer interface (CLI).

A video encoding device may determine, at a MAC layer, that a transmission of a MAC packet has failed. The determination may be made prior to receiving a receiver transmission feedback message indicating the failed transmission. The receiver transmission feedback message may include a receiver report, a negative acknowledgment message from a receiver, an acknowledgment message from the receiver, or the like. The video encoding device may identify a video packet associated with the failed transmission of the MAC packet. The video encoding device may generate a message that indicates that the video packet associated with the failed transmission of the MAC packet. The message may be generated at the MAC layer. The message may be sent from the MAC layer to an application layer. The video encoding device may encode the video stream based on the identified video packet.

A video encoding device may transmit an encoded frame using a transmission protocol. The video encoding device (e.g., a MAC layer or RLC layer at the video encoding device) may determine that a packet transmission has failed. The MAC layer or RLC layer may generate an error notification message. The error notification message may include a custom MMT protocol (MMTP) control message. The error notification message may indicate that transmission of the encoded frame has failed. The error notification message may be sent to a higher layer via MPEG media transport (MMT). The error notification may be sent over an MMT cross layer interface (CLI). The error notification message may be sent on a per-packet basis.

The encoder of the video encoding device may generate a second encoded frame, based on the error notification. The second encoded frame may include an instantaneous decoder refresh (IDR) frame. The encoder may predict the second encoded fame based on a reference picture selection (RPS). In RPS, the encoder may predict the second encoded frame based on the error notification from an uncorrupted reference frame. The encoder may perform rate-distortion optimization to decide between encoding the second frame as an IDR frame or a predicted frame. The encoder may generate a second frame based on a reference set of pictures selection (RSPS). In RSPS, the encoder may generate a second frame based on the error notification from a plurality of uncorrupted reference frames.

A device may retransmit, at the MAC layer, a packet that has failed transmission. The device may include a receiver, a sender, a WTRU, an access point, a device in a mesh network, a device on a transmission path between the receiver and the sender, or the like. The device may determine, at the MAC layer, that a transmission of a MAC packet has failed prior to receiving a receiver transmission feedback message associated with the transmission. The receiver transmission feedback message may include a receiver report, a negative acknowledgment message from a receiver, or an acknowledgement message from the receiver. The device may determine a cause of the failed transmission of the MAC packet. The device may determine the cause of the failed transmission by measuring a channel access delay time associated with the MAC layer. The device may compare the channel access delay time to a predetermined threshold. The cause of the failed transmission may include congestion on a condition that the channel access delay time exceeds the predetermined threshold. The device may determine a resend time for failed transmission of the MAC packet based on the determined cause. The device may gather one or more packet delay statistics. The device may determine a round trip time. The round trip time may be determined based on deep packet inspection. The resend time may be greater than a packet jitter bound and less than a round trip time on a condition that the cause of the failed transmission comprises congestion. The device may gather one or more packet delay statistics. The packet jitter bound may be determined based on the one or more packet delay statistics. The MAC packet may be resent immediately on a condition that the cause of the failed transmission comprises a channel error. The MAC layer of the device may resend the failed transmission of the MAC packet at the determined resend time.

DETAILED DESCRIPTION

A detailed description of illustrative embodiments will now be described with reference to the various figures. Although this description provides a detailed example of possible implementations, it should be noted that the details are intended to be exemplary and in no way limit the scope of the application.

Figure 1:
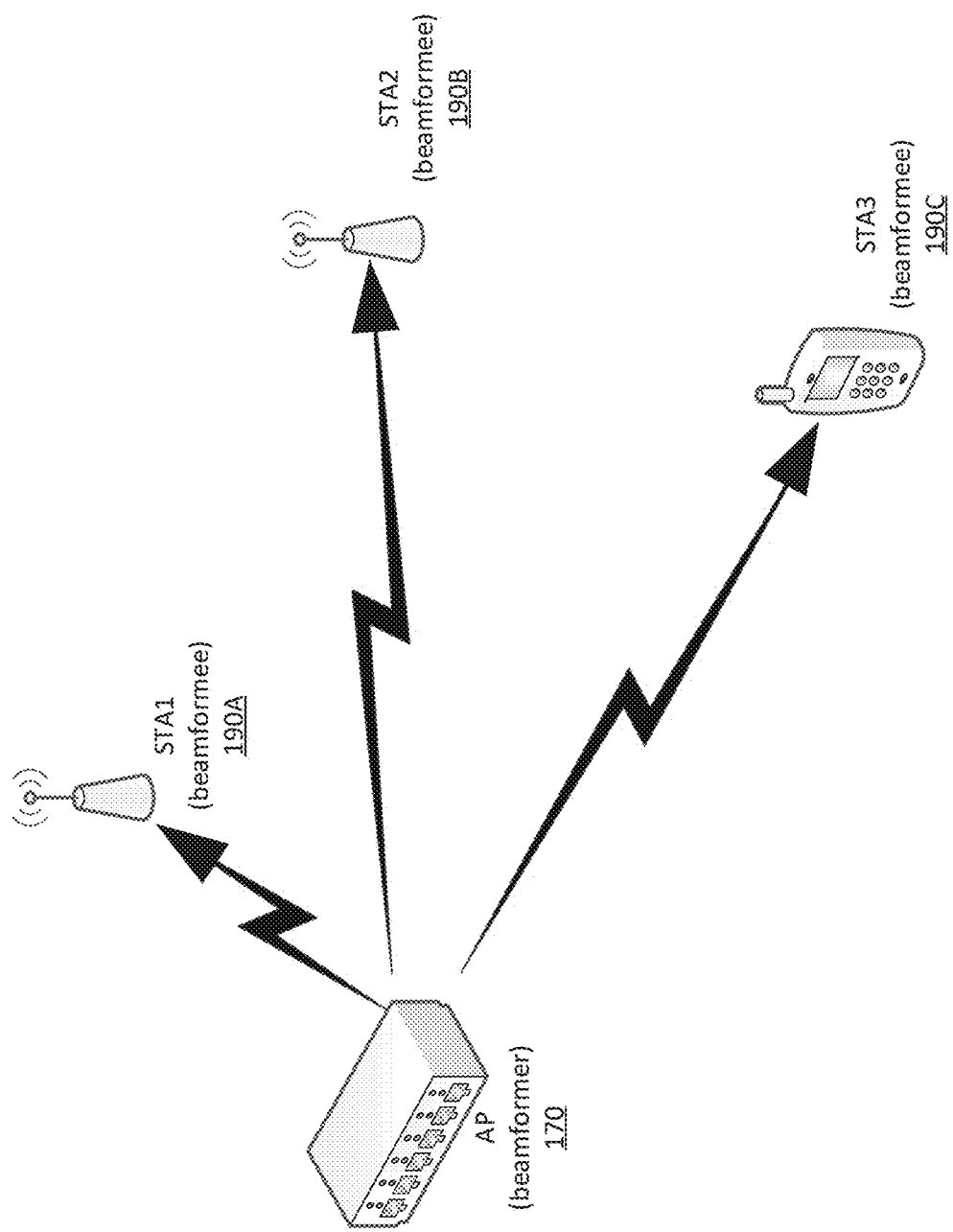
FIG. 1 depicts an example of multi-user transmission from an access point (AP) to multiple stations (STAs).

A WLAN in infrastructure basic service set (IBSS) mode may have an access point (AP) 170 for the basic service set (BSS) and one or more stations (STAs) 190 associated with the AP as depicted by example in FIG. 1. The AP 170 may have access or interface to a Distribution System (DS) or another type of wired/wireless network that may carry traffic in and out of the BSS. Traffic to STAs 190 may originate from outside the BSS, may arrive through the AP 170 and may be delivered to the STAs 190. The traffic originating from STAs 190 to destinations outside the BSS may be sent to the AP 170 to be delivered to the respective destinations. Traffic between STAs 190 within the BSS may be sent through the AP 170 where the source STA may sends traffic to the AP 170 and the AP 170 may deliver the traffic to the destination STA. The traffic between STAs 190 within a BSS may include peer-to-peer traffic. Such peer-to-peer traffic may be sent directly between the source and destination STAs, e.g., with a direct link setup (DLS) using an IEEE 802.11e DLS or an IEEE 802.11z tunneled DLS (TDLS). A WLAN using an Independent BSS (IBSS) mode may have no APs, and the STAs 190 may communicate directly with each other. This mode of communication may be an ad-hoc inode.

Using the IEEE 802.11 infrastructure mode of operation, the AP 170 may transmit a beacon on a fixed channel, usually the primary channel. This channel may be 20 MHz wide, and may be the operating channel of the BSS. This channel may also be used by the STAs 190 to establish a connection with the AP 170. The channel access in an IEEE 802.11 system may include Carrier Sense Multiple Access with Collision Avoidance (CSMA/CA). In this mode of operation, the STAs 190, including the AP 170, may sense the primary channel. If the channel is detected to be busy, the STA may back off. One STA may transmit at any given time in a given BSS.

In IEEE 802.11ac, very high throughput (VHT) STAs may support, e.g., 20 MHz, 40 MHz, 80 MHz, and/or 160 MHz wide channels. The 40 MHz, and 80 MHz, channels may be formed, e.g., by combining contiguous 20 MHz channels. A 160 MHz channel may be formed, for example, by combining eight contiguous 20 MHz channels, or by combining two non-contiguous 80 MHz channels (e.g., referred to as an 80+80 configuration). For the 80+80 configuration, the data, after channel encoding, may be passed through a segment parser that may divide it into two streams. Inverse fast Fourier transform (IFFT), and time domain, processing may be done on each stream separately. The streams may be mapped on to the two channels, and the data may be transmitted. At the receiver, this mechanism may be reversed, and the combined data may be sent to the MAC. IEEE 802.11ac may operate on 5 GHz ISM band.

IEEE 802.11af and IEEE 802.11ab may support sub 1 GHz modes of operation. For these specifications the channel operating bandwidths may be reduced relative to those used in IEEE 802.11n, and IEEE 802.11ac. IEEE 802.11af may support 5 MHz, 10 MHz and/or 20 MHz bandwidths in the TV White Space (TVWS) spectrum, and IEEE 802.11ah may support 1 MHz, 2 MHz 4 MHz, 8 MHz, and/or 16 MHz bandwidths, e.g., using non-TVWS spectrum. IEEE 802.11ah may support Meter Type Control (MTC) devices in a macro coverage area. MTC devices may have capabilities including, for example, support for limited bandwidths, and a requirement for a very long battery life.

In WLAN systems that may support multiple channels, and channel widths, e.g., IEEE 802.11n, IEEE 802.11ac, IEEE 802.11af, and/or IEEE 802.11ah, may include a channel which may be designated as the primary channel. The primary channel may have a bandwidth that may be equal to the largest common operating bandwidth supported by the STAs 190 in the BSS. The bandwidth of the primary channel may be limited by the STA 190, of the STAs such as STAs 190A, 190B, and/or 190C in operating in a BSS, which may support the smallest bandwidth operating mode. For example, in IEEE 802.11ah, the primary channel may be 1 MHz wide, if there may be STAs 190 (e.g., MTC type devices) that may support a 1 MHz mode even if the AP 170, and other STAs 190 in the BSS, may support a 2 MHz, 4 MHz, 8 MHz, 16 MHz, or other channel bandwidth operating mode.

The carrier sensing, and NAV settings, may depend on the status of the primary channel. If the primary channel is busy, for example, due to a STA 190 supporting a 1 MHz operating mode transmitting to the AP 170, the available frequency bands may be considered even though majority of it may stay idle and available.

In the United States, for example, the available frequency bands that may be used by IEEE 802.11ah may be from 902 MHz to 928 MHz. In Korea, for example, it may be from 917.5 MHz to 923.5 MHz. In Japan, for example, it may be from 916.5 MHz to 927.5 MHz. The total bandwidth available for IEEE 802.11ah may be 6 MHz to 26 MHz may depend on the country code.

Figure 2:
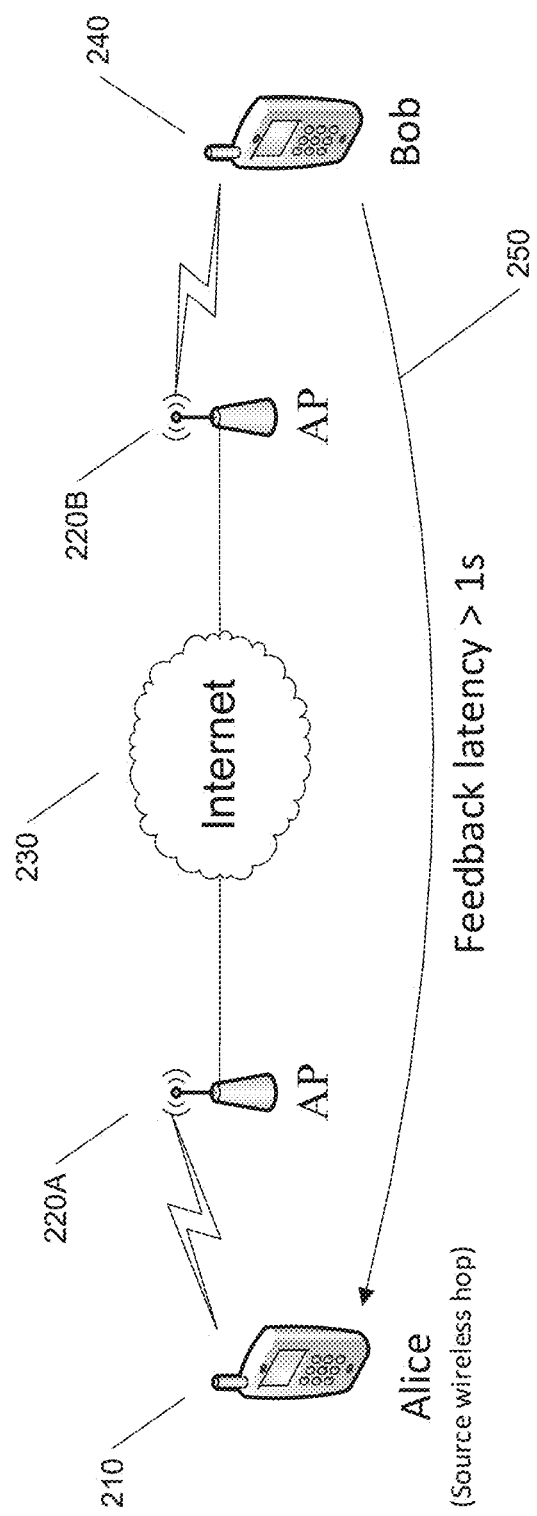
FIG. 2 depicts an example of mobile video telephony operating over WLAN links.

FIG. 2 illustrates exemplary mobile video telephony operating over wireless local area network (WLAN) links and delays therein. Various MAC-layer and cross-layer approaches may be disclosed, for example, relaying, rate control, selective retransmission, smart packet drop, finer prioritization of packets within one stream, and content-specific methods. These may improve delivery of video over WLAN networks. IEEE 802.11 and Wi-Fi Alliance have defined quality-of-service (QoS) provisions to provide different access priorities with extended distributed medium access (EDCA) and hybrid coordination function (HCF) Controlled Channel Access (HCCA).

Transmission errors may occur from time to time. Video quality may be reduced when a packet is lost during transmission. The video decoder may perform error concealment, and, the video encoder may limit the error propagation if the encoder has knowledge of the lost packet. For example, positive acknowledgement (ACK) and/or negative acknowledgement (NACK) may be collected at the receiver and transmitted as a report to the sender. The report may be encapsulated, for example, according to IETF RFC 4585, ITU-T H.271, etc. and carried in RTP Control Protocol (RTCP) reports. As illustrated in FIG. 2, there may be a delay in transmitting the feedback report. The collection period for the RTCP report may be regulated by timing rules, e.g., as specified in RFC 4585.

As depicted in FIG. 2, in a mobile video telephony operating with RTP transport protocol and RTCP-type feedback, for example from Alice 210 to Bob 240, several communication links (e.g., Alice 210 to AP 220A to internet 230 to AP 220B to Bob 240) may be involved. The first or local wireless link may be the closest to the sender and may have the shortest delay. When a packet is lost, it may be noticed by Bob 240 (e.g., Bob's video telephony application) and may be communicated back to Alice 210 via a receiver transmission feedback message. The receiver transmission feedback message may include a receiver report, a negative acknowledgment message from a receiver, an acknowledgment message from the receiver, an RTCP receiver report (RR), an extended report (XR), or the like. The receiver transmission feedback message may be sent periodically (e.g., every 1 second). The receiver transmission feedback message may be sent infrequently. When error notification 250 reaches Alice 210 (e.g., Alice's application), it may be used to direct the video encoder to insert an Intra (or IDR) frame, or to use other codec-level implementations to stop error propagation at the decoder. The longer the delay between the packet loss and receiver transmission feedback message, the longer a part of video sequence that may be affected by the error. The delay between the packet loss and receiver transmission feedback message may be at least one round trip time (RTT). An RTT may range from 50 milliseconds to 1 second. With error concealment (EC) techniques employed in the decoder, one second of delay before refresh may cause significant and visible artifacts (e.g., "ghosting").

Packet loss in the 802.11 transmission may be timely fed back to the video encoder such that error propagation may be mitigated or reduced. The earlier the feedback is received by an encoder, the sooner the video encoder may prevent error propagation, and, a better quality may be experienced in the decoded video. Methods, systems, and instrumentalities are provided herein to signal early packet loss detection and notification at the local link, and the use of a feedback-based video coding method at the application layer. A video encoder and an 802.11 transmitter may be in the same physical device, such as in a WTRU 102 (e.g., a smart phone handset or a tablet computer, etc.) as depicted in FIG. 13B. The WTRU 102 may include an STA 190 that communicates with an AP 170, as depicted in FIG. 1. The early packet loss notification may be made after (e.g., immediately after) the determination has been made that a packet has been lost in the transmission. The early packet loss notification may be made prior to receiving a receiver transmission feedback message associated with the transmission.

IEEE 802.11 links may suffer from transmission errors. Transmission errors may be caused by interference and fading, e.g., from ever-changing wireless channel conditions, collision, etc. Rate adaptation algorithms may be used to account for the change in the channel/network condition. The transmission errors may be unavoidable as part of rate-error tradeoff. 802.11 networks may use carrier sense multiple access/collision avoidance (CSMA/CA) to allow multiple stations to share the same wireless medium without central coordination. Because more than one 802.11 stations may begin transmitting in the same time slot, collisions may happen, which may cause transmission errors. The probability of collisions may be significant or high when the number of stations is large.

The 802.11 standard defines its own acknowledgement (ACK) frame within the Media Access Control (MAC) sub-layer. A receiving station may send an ACK control frame (e.g., after successfully receiving a frame). An 802.11 receiving station may not send a NACK frame, since if the receiving station fails to receive a frame correctly, it may not know which station or stations have sent it. On the transmitting station side, if no ACK is received for a transmitted data frame, for example, due to transmission error or collision, the 802.11 MAC may retransmit the data frame (e.g., until an ACK is received, a predetermined time period expires or a maximum number of transmission attempts may be reached). The MAC layer may determine that a transmission of a MAC packet has failed. The MAC layer may determine that the transmission of the MAC packet has failed by determining that an ACK message has not been received. The transmission of the MAC packet may be determined to be failed when an ACK message has not been received in a predetermined period of time. The transmission of the MAC packet may be determined to have failed when an ACK message has not been received after a predetermined number of retransmission attempts. The predetermined number of transmission attempts may be configurable in the 802.11 MAC and may be, for example, set to 7 for the non-HCF (Hybrid Control Function) case or 4 for the HCF case. Retransmission may be employed by 802.11 to deal with transmission errors in each transmission attempt. Repeated transmission errors may potentially lead to loss of the packet. In 802.11, there may be no indication of transmission failure from the 802.11 MAC sub-layer to the upper sub-layer, for example, the Logical Link Control (LLC). When a frame has been determined to have failed transmission, the 802.11 MAC sub-layer may drop the frame and stop trying.

Early packet loss detection may be determined by a video encoding device. The video encoding device may determine the early packet loss at the MAC layer. The early packet loss determination may be made prior to receiving a receiver transmission feedback message.

Figure 3:
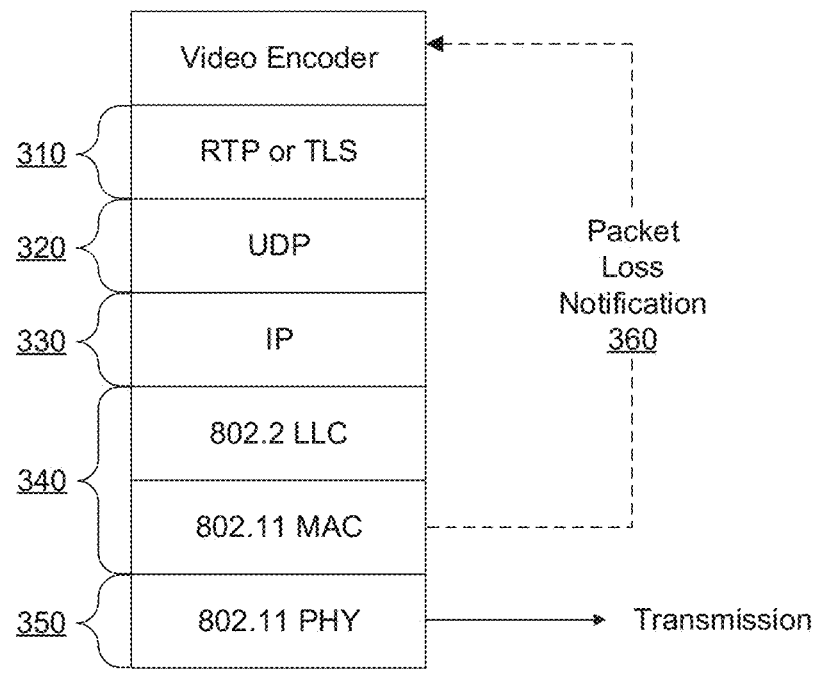
FIG. 3 depicts an example of video encoder and IEEE 802.11 in the internet protocol stack.

Standard-based communication systems may include a stack of protocol layers. For example, the Internet protocol suite (or TCP/IP) may include application 310, transport 320, network 330, MAC 340, and/or physical 350 layers. 802.11 may fit into the physical 350 and/or MAC 340 sub-layer, and the packet loss feedback 360 may traverse up from the 802.11 MAC layer 340 to the application layer 310, as depicted by example in FIG. 3.

Application layer protocol examples may include one or more of the following: a video encoder may generate Real-time Transport Protocol (RTP) packets, and Secure Real-time Transport Protocol (SRTP) may be used for RTP delivery; or a video encoder may generate Network Abstraction Layer (NAL) packets, and Transport Layer Security (TLS) may be used at the application layer for security.

An RTP sequence number may not be encrypted (e.g., where RTP packets are being transported using the SRTP protocol). The RTP sequence number may be available to the 802.11 MAC sub-layer, for example, through deep packet inspection for identifying video packets. A sequence number may be encrypted with a payload (e.g., where Network Abstraction Layer (NAL) packets may be transported by using the Transport Layer Security (TLS) protocol). The sequence number may not be available to the 802.11 MAC for identification of video packets. Packet loss detection may be performed in the 802.11 MAC (e.g., to determine if a packet has failed transmission to the receiver). For video data, for example, a transmission failure may be defined as when a MAC protocol data unit (MPDU) has failed transmission (e.g., after a predetermined duration of time). The predetermined duration may be set, for example, based on the type of application (e.g., video conferencing, video calling, etc.). The packet from a video stream for which the transmission has failed may be identified (e.g., upon the detection of a packet loss). The video packet may be identified by a sequence number. The sequence number may include an RTP sequence number, an NAL sequence number, or a number that uniquely identifies the video packet.

If there are multiple applications or multiple video streams using 802.11 concurrently, video packets for a stream (e.g., a stream of the multiple video streams) may be identified. A video stream may be identified by the IP 5-tuple including source and destination IP addresses, source and destination port numbers, and/or protocol type. A video packet may be identified (e.g., uniquely identified) by its RTP sequence number $SN_{RTP}$, which may be determined by the 802.11 MAC through deep packet inspection.

TLS may encrypt the 802.11 payload. TLS may encrypt the 802.11 payload when packets are transported using the TLS protocol. The MAC sub-layer may not be able to identify sequence numbers or timestamps in the video packet (e.g., directly). For example, the 802.11 MAC may be limited to seeing the encrypted data. The TLS protocol may perform encryption and may establish the mapping between the NAL sequence number $SN_{NAL}$ in the video packet and the encrypted data. For example, a part of the encrypted data denoted as $ID_{TLS}$, may be used as a "signature," and a table-lookup may be performed. The TLS layer may find the corresponding sequence number, $SN_{NAL}$, from the TLS encrypted data, $ID_{TLS}$.

Encrypted data may appear to be random. A longer pattern (e.g., encryption pattern) may be chosen, for example, to increase the probability that the signature will be unique for a given number of video packets. Consider M random patterns including N bits each, there may be $2^N!/(2^N-M)!$ ways the M patterns may be selected from $2^N$ possible patterns such that they are unique. The total number of choices of M patterns may be $2^{NM}$. The probability that the M patterns may be unique may be: $2^N!/(2^{NM}(2^N-M)!)$. For example, if the video encoder generates 30 packets per second, a signature pattern $ID_{TLS}$ may be unique among the M=90 consecutive packets over a 3-second period, such that each video packet may be uniquely identified. The probability that any two patterns out of 90 would match may be less than one in a million ($9.32 \times 10^{-7}$) (e.g., if a signature length N=32 bits (4 bytes) is chosen).

In the 802.11 MAC, data may arrive from the LLC sub-layer as MAC service data units (MSDUs). Transmission failures may happen at the MAC/PHY layers. The transmission failures may be identified by the MAC as lost MAC packets (e.g., MPDUs). The mapping between MSDU and MPDU may not be one-to-one (e.g., because of aggregation and fragmentation allowed by 802.11). When a MAC packet fails transmission, more than one MSDU or IP packets may be affected. An MPDU may be identified by its Sequence Control (SC) $SC_{MPDU}$. An MSDU may be identified by its sequence number $SN_{MSDU}$. For identifying video packets, the $SC_{MPDU}$ of a failed MPDU may be mapped to an $SN_{RTP}$ (e.g., in the scenario where SRTP may be used to transport RTP packets). The $SC_{MPDU}$ of a failed MPDU may be mapped to an $SN_{NAL}$ (e.g., in the scenario where TLS may be used to transport NAL packets). The mapping $SC_{MPDU} \rightarrow SN_{MSDU}$ may be established (e.g., when a transmission failure occurs) by looking up a table established during the aggregation and the fragmentation processes in the 802.11 MAC. An entry in the table may be added when an MSDU is aggregated and/or fragmented. An entry in the table may be deleted once an MSDU is deemed successfully transmitted or lost. The mapping $SN_{MSDU} \rightarrow SN_{RTP}$ (e.g., in the scenario where SRTP may be used to transport RTP packets) or $SN_{MSDU} \rightarrow ID_{TLS}$ (e.g., in the scenario where TLS may be used to transport NAL packets) may be established.

The mapping of $SC_{MPDU} \rightarrow SN_{MSDU} \rightarrow SN_{RTP}$ may provide information for notifying the video encoder of a packet loss (e.g., when SRTP is used to transport RTP packets). The MAC layer may filter out other data streams. The MAC layer may detect packet loss. The MAC layer may detect packet loss via an $SC_{MPDU}$. The MAC layer may map the $SC_{MPDU}$ to an $SN_{MSDU}$. The MAC layer may map the $SN_{MSDU}$ to an $SN_{RTP}$. The video encoder may encode video into packets. The encoded video packets may include RTP packets. The video encoder may map the $SN_{RTP}$ to a portion of a video stream. The video encoder may map the $SN_{RTP}$ to at least one video frame or video slice. The video encoder may perform prediction resetting based on the packet loss feedback.

A mapping $ID_{TLS} \rightarrow SN_{NAL}$ may be performed in the TLS layer to accomplish $SC_{MPDU} \rightarrow SN_{MSDU} \rightarrow ID_{TLS} \rightarrow SN_{NAL}$ mapping (e.g., where TLS may be used to transport NAL packets). The MAC layer may filter out other data streams. The MAC layer may detect packet loss. The MAC layer may detect packet loss via an $SC_{MPDU}$. The MAC layer may map the $SC_{MPDU}$ to an $SN_{MSDU}$. The MAC layer may map the $SN_{MSDU}$ to an $ID_{TLS}$. The TLS layer may map the $ID_{TLS}$ to an $SN_{NAL}$. The video encoder may encode video into packets. The encoded video packets may include NAL packets. The video encoder may map the $SN_{NAL}$ to a portion of a video stream. The video encoder may map the $SN_{NAL}$ to at least one video frame or video slice. The video encoder may perform prediction resetting based on the packet loss feedback. The mappings may include one-to-many. Systems, methods, and instrumentalities described herein may be applied to protocols other than SRTP or TLS.

A packet loss may be notified via a message (e.g., a feedback message). The message may traverse several protocol layers. The packet loss may be notified (e.g., when the protocol layers are implemented in the same physical device) using one or more of the following: an application programming interface (API), software mailboxes, sockets, other forms of inter-process communications such as shared memory or operating system-level signals, or the like. The message may pass through standard protocol interfaces, such as IP (e.g., when the video encoder and the 802.11 MAC are not in the same physical device or are provided by different vendors). An additional standard or a proprietary protocol may be used for notification of packet loss (e.g., so that a notification may be understood by the receiver). The message may be formatted as a standard packet. The message may be formatted as a receiver transmission feedback message. The message may spoof a standard packet.

A MAC layer (e.g., an 802.11 MAC layer) may spoof a standard packet. The spoofed packet may appear to have originated from a receiver, as depicted by Bob 240 in FIG. 2. The spoofed packet may be formatted as a spoofed NACK packet, a spoofed ACK packet, a spoofed extended report (XR) packet, or a receiver transmission feedback message. The receiver transmission feedback message may be a NACK message from the receiver, an ACK message from the receiver, an RTCP receiver report (RR), an extended report (XR), or the like. A spoofed packet (e.g., a spoofed NACK packet, a spoofed ACK packet, or a spoofed XR packet) may include, for example, an imitated packet, a mocked packet, a standard packet generated at a time or by an entity other than the time or an entity specified in a standard, and/or the like. The spoofed packet may originate from a video encoding device or a router in a network. The spoofed packet may originate from a MAC layer of the video encoding device. The spoofed packet may be in the format of an RTCP receiver report or an RTCP NACK packet.

Figure 7:
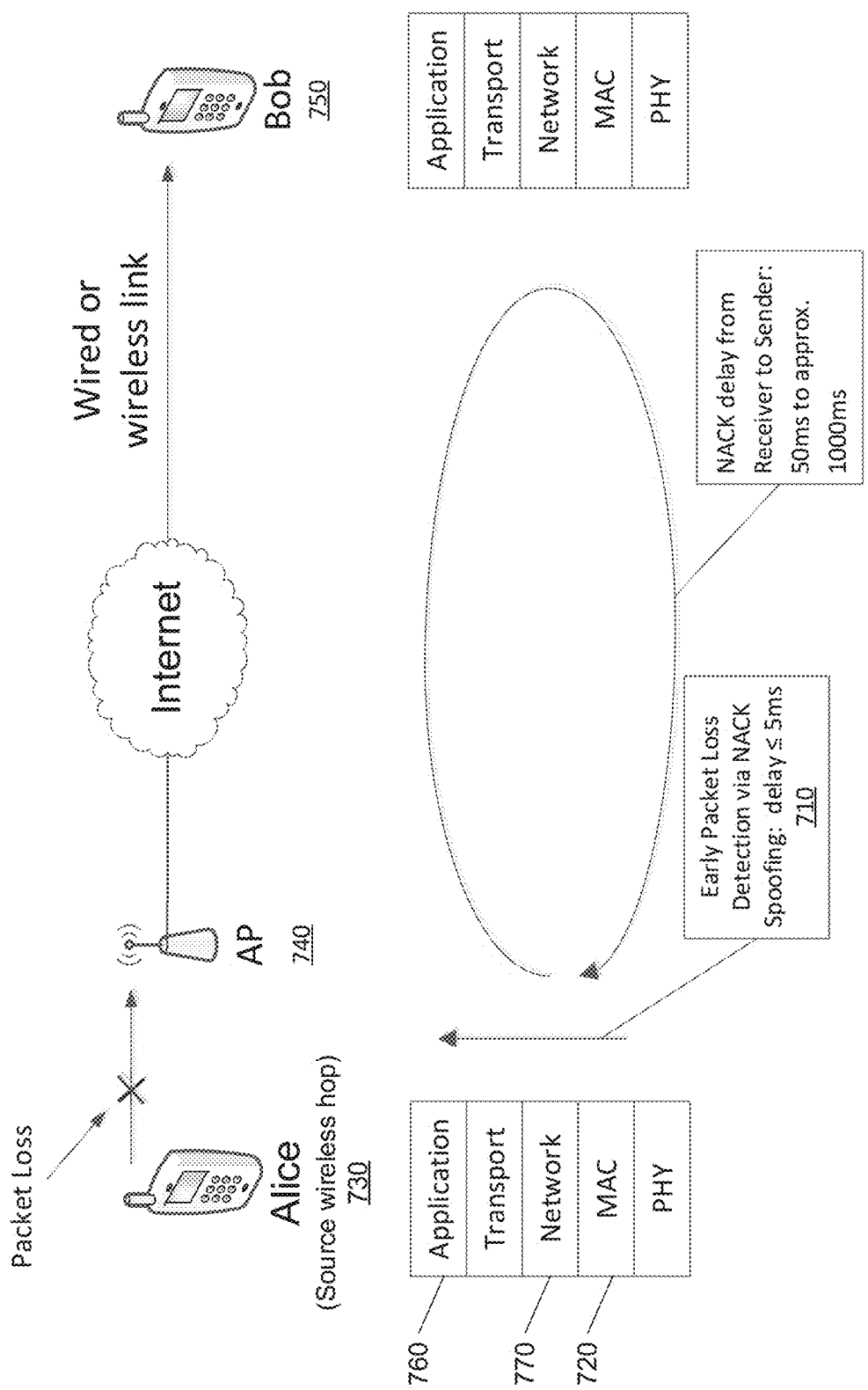
FIG. 7 depicts an example of early packet loss detection in an uplink transmission via negative acknowledgement (NACK) spoofing.

FIG. 7 depicts an example of early packet loss detection via negative acknowledgement (NACK) spoofing. A source wireless hop, Alice 730, may send a transmission to a receiver, Bob 750, via an AP 740. The transmission may include a packet (e.g., a MAC protocol data un it (MPDU)). The packet may be lost between Alice 730 and the AP 740. The receiver, Bob 750, may send a NACK message to the source wireless hop, Alice 730, that indicates that transmission of the packet has failed. The NACK message may be delayed. The MAC layer 720 of the source wireless hop, Alice 730, may detect that an MPDU has been lost (e.g., after a predetermined number of retransmission attempts without receiving an ACK (e.g., from the AP 740 or the receiver 750) for the transmitted MPDU. The MAC layer 720 may determine which RTP packet has been lost (e.g., by doing deep packet inspection). The packet loss may be notified via NACK spoofing 710. The MAC layer 720 may signal (e.g., inform the video sender 730 of) a packet loss via a NACK packet (e.g., a spoofed NACK packet). The MAC layer 720 may generate a spoofed NACK packet. The MAC layer 720 may send (e.g., directly or indirectly send) the spoofed NACK packet to the RTP layer 760 (e.g., the application layer). The RTP layer 760 may retransmit the lost RTP packet (e.g., when the spoofed NACK packet is received).

The MAC layer 720 may locate the payload of the MPDU that has been lost (e.g., transmission of the MPDU was not successful). Multiple MPDUs may be reassembled as a MAC service data unit (MSDU) (e.g., when MAC layer segmentation has been applied).

The MAC layer 720) (e.g., a MAC entity) may look at the protocol field of a packet header (e.g., if the payload is an IP packet). The protocol field may indicate UDP. A record of the source IP address may be kept (e.g., if the protocol field indicates UDP). A record of the destination IP address may be kept. The source port number and/or the destination port number fields in the UDP packet header may be examined (e.g., possibly together with other information such as that carried in SIP/SDP messages) to determine whether the payload is an RTP packet. The MAC layer 720 may locate the Payload Type (PT) field, and check if the packet is a video packet. The Contributing Source (CSRC) identifier field and the Sequence Number field in the RTP packet header may be detected (e.g., if the packet is a video packet).

The MAC layer 720 may build a NACK packet (e.g., a spoofed NACK packet) by creating an RTCP packet. The NACK packet may include an RTCP packet. The RTCP packet may include a transport layer feedback message (e.g., PT=RTPFB per IETF RFC 4585). The RTCP packet may include a generic NACK packet (e.g., FMT=1 per IETF RFC 4585). The synchronization source identifier (SSRC) field may be set as the CSRC that may be detected in the RTP packet header. The sequence number field may be set as the sequence number that may be detected in the RTP packet header. The NACK packet may contain a start packet ID of multiple lost packets and a bitmask of following lost packets (BLP). The NACK packet may be generated for each lost packet (e.g., with BLP as 0).

The MAC layer 720 may send (e.g., directly or indirectly) the NACK packet to the RTP layer 760. The MAC layer 720 may add a user datagram protocol (UDP) header and/or an internet protocol (IP) header and may send the resulting IP packet to the IP layer 770. Port numbers (e.g., the source port number or the destination port number) used for the UDP packets going from the receiver to the sender may be obtained for example, by inspecting the SIP/SDP messages exchanged at the beginning of the session setup, by inspecting the received MPDUs on route to the video sender, or the like. The source port number may include the destination port number in the UDP packet header and the destination port number may include the source port number in the UDP packet header (e.g., if the UDP sending port and receiving port are the same). The source IP address of the IP packet may include the destination IP address that may be obtained from the protocol field of the IP packet header. The destination IP address may include the source IP address that may be obtained from the protocol field of the IP packet header.

The RTP layer 760 (e.g., the RTP layer at the sender) may resend the lost RTP packet indicated as lost in the NACK packet (e.g., the spoofed NACK packet). The RTP layer 760 may ignore NACK packets from the receiver (e.g., normal NACK packets). The sender 730 may distinguish a NACK packet from the receiver 750 (e.g., a normal NACK packet) from a NACK packet from the MAC layer 720 (e.g., a spoofed NACK packet) based on an indicator in the NACK packet. For example, the sender may determine a value (e.g., an unassigned value) for the feedback message type (FMT) bit based on whether a NACK packet (e.g., a spoofed NACK packet) is built at the MAC layer 720.

A packet loss may be notified via extended report (XR) spoofing. The MAC layer 720 (e.g., a MAC entity) may generate an XR packet (e.g., a spoofed XR packet). The MAC layer 720 may locate the payload of a MPDU that has been lost (e.g., transmission of the MPDU was not successful). Multiple MPDUs may be reassembled as a MAC service data unit (MSDU) (e.g., when MAC layer segmentation has been applied).

The MAC layer 720 may look at the protocol field of a packet header (e.g., if the payload is an IP packet). The protocol field may indicate UDP. A record of the source IP address may be kept (e.g., if the protocol field indicates UDP). A record of the destination IP address may be kept. The source port number and/or the destination port number fields in the UDP packet header may be examined (e.g., possibly together with other information such as that carried in SIP/SDP messages) to determine whether the payload is an RTP packet. The MAC layer 720 may locate the Payload Type (PT) field, and check if the packet is a video packet. The Contributing Source (CSRC) identifier field and the Sequence Number field in the RTP packet header may be detected (e.g., if the packet is a video packet).

The MAC layer 720 may build an XR packet (e.g., a spoofed XR packet). A spoofed XR packet may be formatted in accordance with IETF RFC 361.11. The MAC layer 720 may send (e.g., directly send) the XR packet (e.g., the spoofed XR packet) to the RTP layer 760. The MAC layer 720 may add a user datagram protocol (UDP) header and/or an internet protocol (IP) header and may send the resulting IP packet to the IP layer 770. Port numbers (e.g., the source port number or the destination port number) used for the UDP packets going from the receiver 750 to the sender 730 may be obtained for example, by inspecting the SIP/SDP messages exchanged at the beginning of the session setup, by inspecting the received MPDUs on route to the video sender 730, or the like. The source port number may include the destination port number in the UDP packet header and the destination port number may include the source port number in the UDP packet header (e.g., if the UDP sending port and receiving port are the same). The source IP address of the IP packet may include the destination IP address that may be obtained from the protocol field of the IP packet header. The destination IP address may include the source IP address that may be obtained from the protocol field of the IP packet header.

The RTP layer 760 (e.g., the RTP layer at the sender) may resend the lost RTP packet indicated as lost in the XR packet (e.g., the spoofed XR packet). The RTP layer 760 may ignore NACK packets from the receiver 750 (e.g., normal NACK packets). For example, the RTP layer 760 may not resend an RTP packet indicated in a normal NACK packet. The sender 730 may distinguish a NACK packet from the receiver 750 (e.g., a normal NACK packet) from an XR packet from the MAC layer 720 (e.g., a spoofed XR packet).

A packet loss may be notified via ACK spoofing. A device (e.g., a WTRU or an AP) may spoof an ACK packet. The ACK (e.g., a spoofed ACK packet) may be generated when the MPDUs (e.g., all of the MPDUs) that belong to an RTP packet are successfully sent (e.g., sent across a wireless channel). The sender 730 may infer the loss of a packet by detecting a gap in the sequence numbers of the packets for which the spoofed ACKs are received. The sender 730 may retransmit the lost packet. The normal ACKs (e.g., ACKs sent from the receiver 750) may be ignored by the sender 730.

A MAC layer may handle UDP, RTP, and/or SRTP packet loss. Encryption may be used. The payload of a NACK packet generated by the MAC layer (e.g., the spoofed NACK packet) may be encrypted by the sender. The MAC layer may not know an encryption key used for encrypting the spoofed NACK packet. Packet loss may be handled at the MAC layer. For example, the MAC layer may detect a packet loss. The lost packet may include an MPDU. The MAC layer may observe that an ACK is not received after a predetermined period of time or a predetermined number of transmission attempts for an MPDU. The MAC layer may resend the lost MPDU. The retransmission MPDU may be sent immediately or with a delay. The MAC layer may determine the resend time based on the cause of the packet loss. An MPDU may be lost due to congestion. An MPDU may be lost due to a channel error (e.g., deep fade, interference, or the like). The retransmission MPDU may be sent immediately (e.g., as soon as possible, with substantially no delay, with minimal delay) when channel error caused the packet loss. The resend time when packet loss is due to congestion is substantially delayed when compared to a resend time when packet loss is due to channel error. The MAC layer may distinguish between packet losses caused by congestion from packet losses caused by channel error. For example, the MAC layer may measure the delay time (e.g., the defer time) in channel access (e.g., in IEEE 802.11). The receiver may infer that a wireless link is congested, e.g., if the delay time in channel access exceeds a predefined threshold.

Packet loss may be used as a signal for congestion control (e.g., in video telephony applications such as WebRTC). Retransmission of a lost packet (e.g., a congestion caused lost packet) may be delayed. Retransmission of a lost packet may be delayed such that retransmission may occur at a time greater than a delay bound for the lost packet (e.g., the RTP packet) but less than a round trip time (RTT). The receiver may infer that there is congestion and the lost packet may be delivered so that impact on the video decoding process may be reduced.

The MAC layer may use an RTP packet jitter bound to determine whether to send a spoofed NACK packet. The RTP packet jitter bound may include an RTP delay jitter bound. The RTP packet jitter bound may be defined such that an RTP packet received one-way end-to-end delay plus the RTP packet jitter bound may be considered lost. One RTT may be defined as the least duration of error propagation or video freeze where the NACK is sent by the video receiver (e.g., the normal NACK). NACK spoofing may be used when the resulting error propagation or video freeze is less than one RTT. A retransmission delay time may be greater than the RTP packet jitter bound and may be less than, one RTT when the cause of the failed transmission includes congestion. The MAC layer may resend the lost packet after the retransmission delay time. When the jitter bound is less than one RTT, the receiver may send a NACK to the sender (e.g., a normal NACK) to get a timely retransmission of an RTP packet from the RTP layer of the sender.

A retransmission delay time, d, may be selected such that $d=\alpha \times$(RTP packet jitter bound) (e.g., if $\alpha>1$ and if $\alpha \times$(RTP packet jitter bound)<RTT). The MAC layer may resend the lost packet after d. The RTT may be measured by the RTP layer (e.g., during the session setup phase where handshakes occur). The RTT may be passed to the MAC layer. The RTT may be measured by the MAC layer by deep packet inspection (e.g., on the control signaling such as SIP/SDP messages during call setup).

The RTP packet jitter bound may be sent from the receiver to the sender at the RTP layer. The RTP packet jitter bound may be passed to the MAC layer (e.g., through cross layer signaling). The average RTP packet jitter bound may be sent from the receiver to the sender at the RTP layer. The average RTP packet jitter bound may be passed to the MAC layer (e.g., through cross layer signaling). The RTP packet jitter bound may be estimated at the RTP layer of the sender. The RTP packet jitter bound may be estimated at the MAC layer of the sender. The sender or the MAC may gather one or more RTP packet delay statistics. The sender or the MAC may calculate the RTP packet jitter bound based on the one or more RTP packet delay statistics. The RTP packet jitter bound may be related to the RTT. For example, a video application may set the RTP packet jitter bound as $\beta \times$RTT. B may be a constant. The RTP packet jitter bound may be calculated based on an available RTT estimate.

A MAC layer may handle packet loss of TCP packets. The TCP layer may perform congestion control. The TCP layer may react to a packet loss as if it were caused by congestion. The MAC layer may identify an MPDU that carries IP/TCP payload (e.g., by deep packet inspection). The MAC layer may determine the cause of a packet loss. The MAC layer may delay retransmission of an MPDU on a condition that the packet loss is caused by congestion). The TCP receiver may see an out-of-order TCP packet sequence. An out-of-order TCP packet sequence may trigger the transmission of duplicate ACKs. The TCP sender may reduce its sending rate (e.g., upon receiving three or more than three duplicate ACKs). The MAC layer may resend an MPDU as soon as possible to minimize the occurrence of duplicate ACKs (e.g., if channel error caused the packet loss).

A MAC layer may handle video layer packet loss. The MAC layer that handles video layer packet loss may be on the video sender. An XR RTCP packet may be spoofed at the MAC layer on the video sender. The video coding layer (e.g., video telephony application) may react to the early detected packet loss. An XR packet (e.g., a spoofed XR packet) may be generated and interpreted based on IETF RFC 3611. An XR packet may include one or more synchronization source identifiers (SSRCs). A payload type for an XR packet may include 207. An XR packet may or may not include a FMT value bit.

An XR packet (e.g., a spoofed XR packet) may include an RTP sequence number that corresponds to a lost MAC layer packet. The MAC layer may check the MPDU payload (e.g., to confirm the inspected packet is indeed IP/UDP/RTP/Video packet). Multiple MPDUs may be reassembled as a single MSDU before doing deep packet inspection (e.g., if MAC layer segmentation is applied earlier). The XR packet may be generated as soon as a MPDU is determined to be lost (e.g., for timely signaling). The begin_seq and end_seq of the reporting RTP sequence number may be the same value. The bit vector chunk field may be set to all 0s except that the first bit is 1. A chunk type may require that the first bit in the bit vector chunk field be set to 1. The video encoder may encode the next video frame in the intra mode (IDR), trigger reference picture selection, or trigger reference set of picture selection (e.g., when the video encoder receives the XR packet).

The video sender may encode a frame based on inspection of one or more received XR packets. The video sender may ignore subsequent XR packets after receipt of a first XR packet. The multiple XR packets may carry frame numbers (e.g., the frame numbers of different lost frames). When a video sender receives a first XR packet that indicates the loss of frame n1, the video sender may encode a frame (e.g., a future frame n1+L, where L is a non-negative integer) as an IDR frame. When the video sender receives a second XR packet that indicates the loss of frame n2, the video sender may check if $n2 \geq n1+L$. If $n1 \geq n1+L$, the video sender may encode a frame (e.g., a frame after frame n2) as an IDR frame. If $n2 \leq n1++L$, the video sender may ignore (e.g., safely ignore) the second XR packet.

Figure 8:
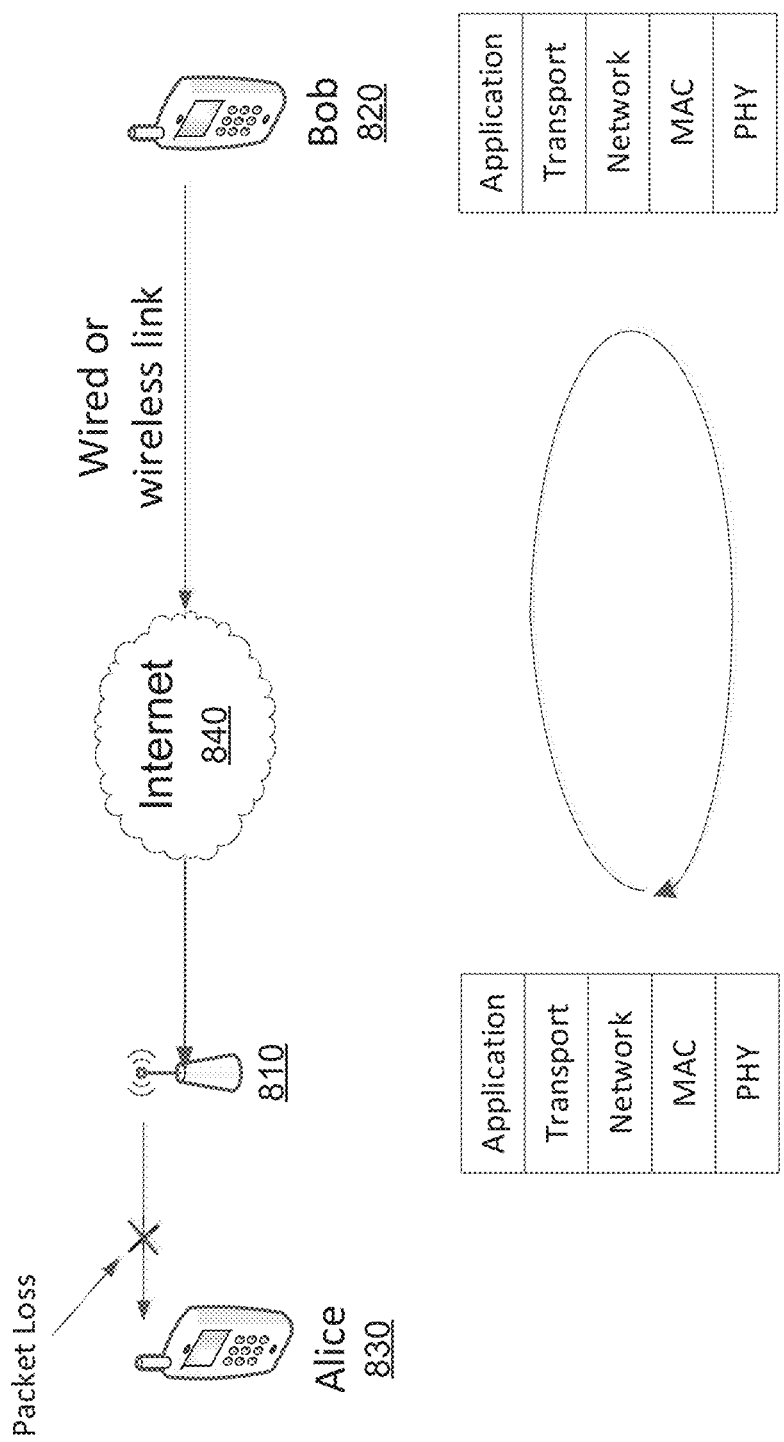
FIG. 8 depicts an example of early packet loss detection in a downlink transmission via NACK or extended report (XR) spoofing.

As depicted in FIG. 8, a device 810 may detect early packet loss in downlink operations. A sender, such as Bob 820, may send a transmission to a receiver, such as Alice 830, via the internet 840 and a device 810 on the wireless link (e.g., an AP or an eNodeB). A packet may be lost in the transmission. The packet may be lost on the wireless link between the device 810 and Alice 830. The device 810 on the wireless link may send a NACK packet (e.g., a spoofed NACK packet).

Figure 9:
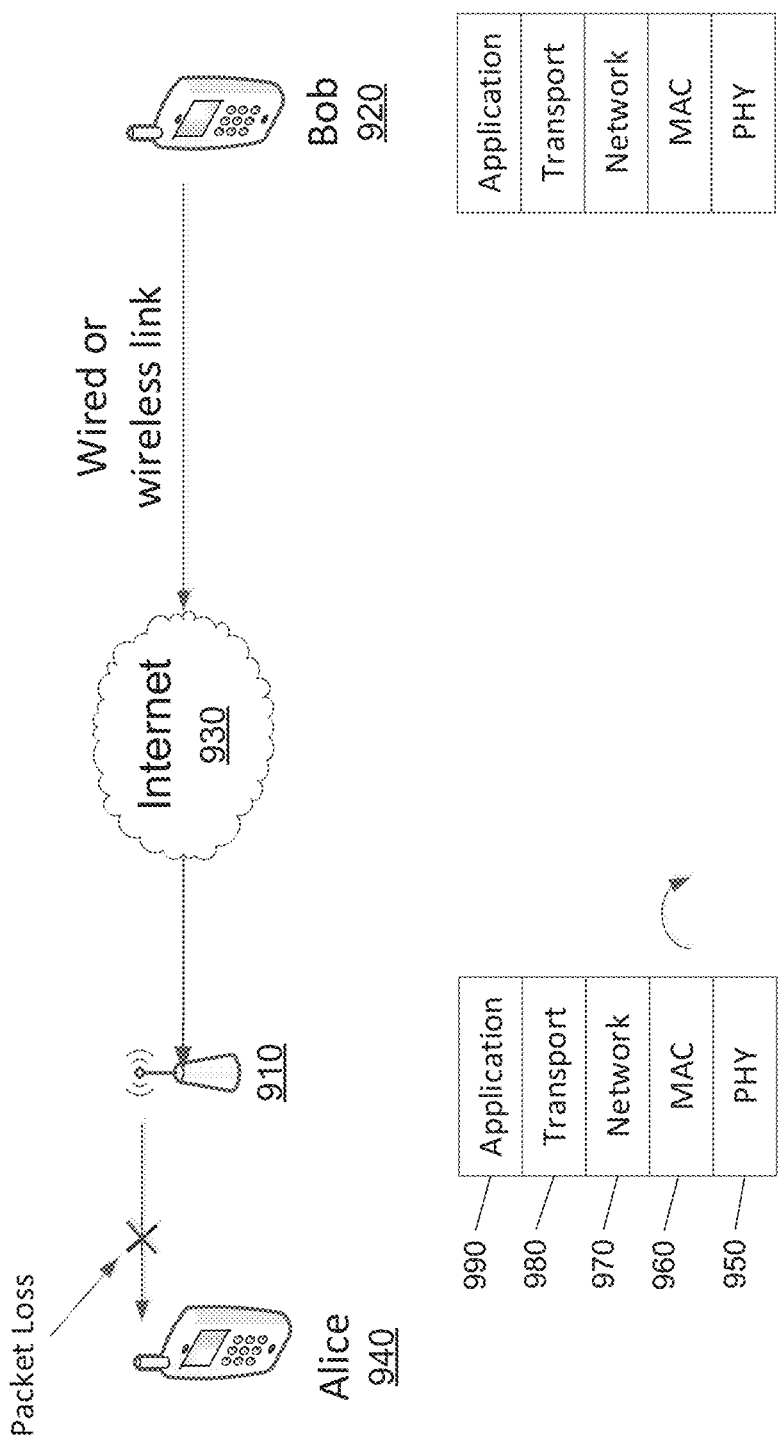
FIG. 9 depicts an example of media access control (MAC) layer retransmission in a downlink transmission.

As depicted, in FIG. 9, a device 910 may retransmit a lost packet. A sender, such as Bob 920, may send a transmission to a receiver, such as Alice 940, via the internet 930 and a device 910 on the wireless link. The device 910 on the wireless link may be an AP, an eNodeB, or the like. A packet may be lost in the transmission. The packet may be lost on the wireless link between the device 910 and Alice 940. The device 910 on the wireless link (e.g., an AP or an eNodeB) may retransmit the lost packet at the MAC layer 960. The device 910 may retransmit the lost packet after a retry limit (e.g., 7 retries in IEEE 802.11) is reached. The device 910 may retransmit the lost packet with or without a delay. The device 910 may determine whether to retransmit the lost packet with or without a delay based on a cause of the packet loss. The cause of packet loss may include congestion, poor channel quality, or the like. The device 910 on the wireless link may send an XR packet (e.g., a spoofed XR packet). As described herein, the device 910 may include a downlink transmitter. The device 910 may gather packet statistics (e.g., if the RTCP packets are not encrypted). The packet statistics may include RTT statistics, an RTP packet jitter bound, or the like. The device 910 may receive the packet statistics from the receiver, such as Alice 940. The device 910 may infer the packet statistics if the packets are encrypted. For example, the device 910 may determine an RTT based on the three-way handshake message exchange of a TCP connection between the source, such as Bob 920, and the receiver, such as Alice 940. An application that supports text messaging and file transfer may support a TCP connection. The device 910 may maintain a database of applications (e.g., Skype, Facetime, Google Hangout, etc.). The database may identify a procedure to determine the RTT based on a fixed pattern in a message exchange of the application. The procedure may determine an RTP packet jitter bound based on a relationship with the RTT. The device 910 may determine the application and apply the corresponding procedure to determine the RTT and the RTP packet jitter bound.

Figure 10:
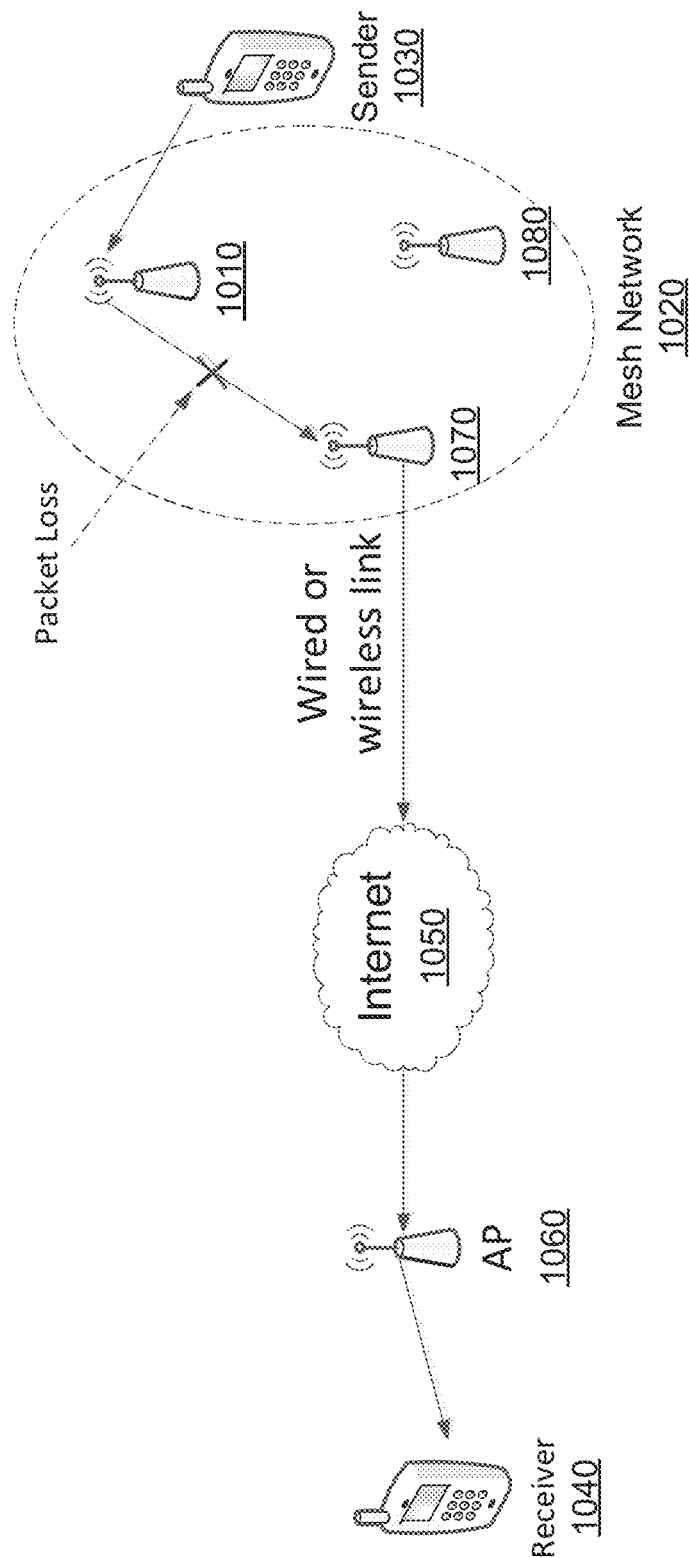
FIG. 10 depicts an example of a wireless link on the transmission path performing early packet loss detection and retransmission.

As depicted in FIG. 10, a device 1010 may detect early packet loss in network operations. A sender may access the internet 1050 through a mesh network 1020. The mesh network may include multiple devices 1010, 1070, 1080. A sender 1030 may send a transmission to a receiver 1040 via the mesh network 1020, the internet 1050, and an access point 1060. The transmission may be sent via one or more devices 1010, 1070, 1080, in the wireless mesh network 1020. A device 1010 in the mesh network may perform early packet loss detection by sending a spoofed NACK packet, sending a spoofed XR packet, or sending a spoofed ACK packet as described herein. The device 1010 in a wireless mesh network 1020 may perform MAC layer retransmission. The device 1010 may send the spoofed packet (e.g., spoofed NACK packet, spoofed XR packet, or spoofed ACK packet) back to the sender 1030. The device 1010 may perform MAC layer retransmission after reaching the maximum retransmission limit locally (e.g., at the device 1010 that may perform early packet loss detection) as described herein. The MAC layer of the device 1010 may handle TCP packet losses as described herein.

Figure 11:
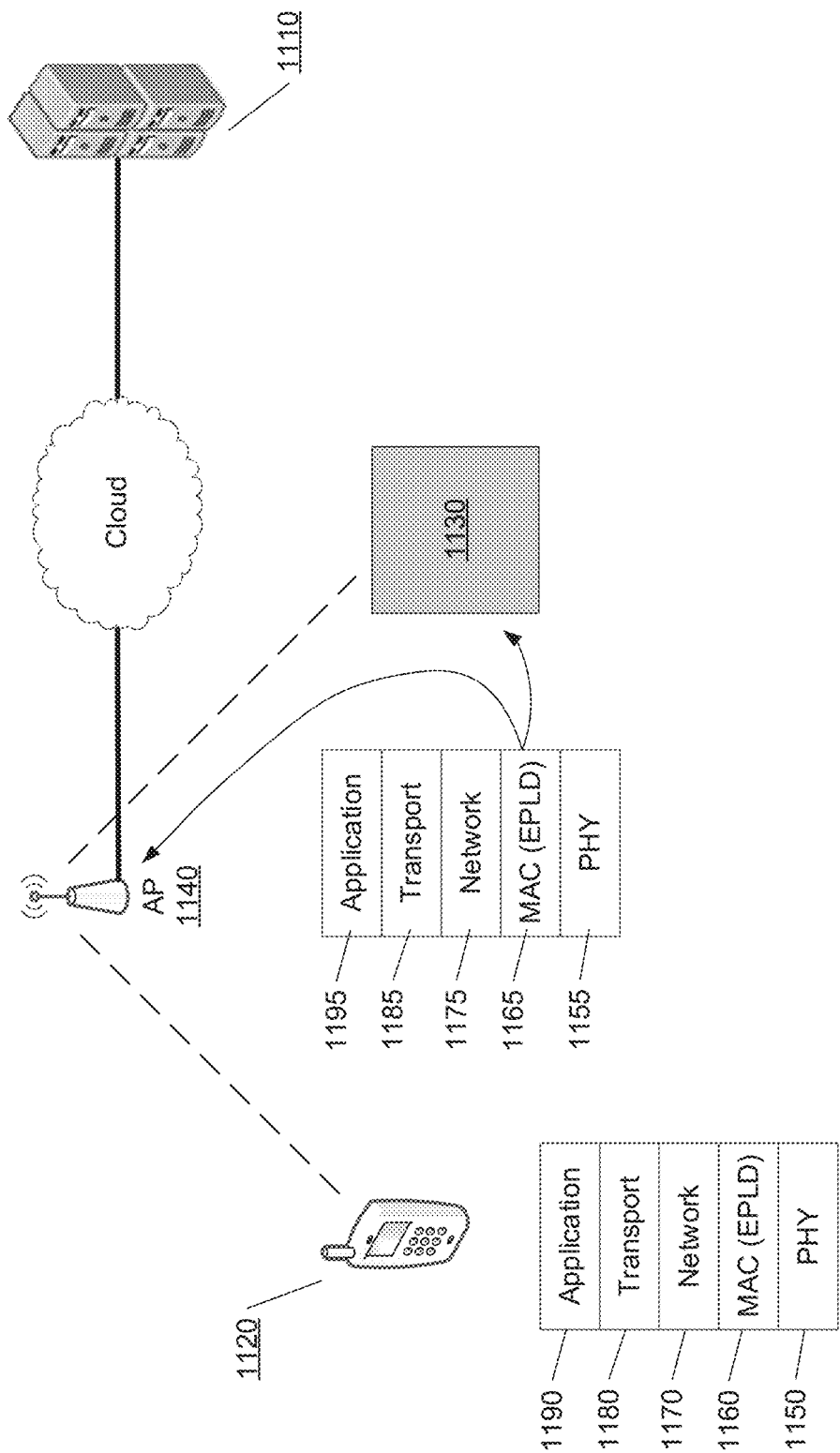
FIG. 11 depicts an example of early packet loss detection in video cloud gaming.

As depicted in FIG. 11, early packet loss may be detected in cloud video gaming applications. Video may be rendered at a server 1110 (e.g., a cloud gaming server) and may be sent to a mobile console 1120 via an AP 1140. The mobile console may implement a protocol stack that includes a physical layer 1150, a MAC layer 1160, a network layer 1170, a transport layer 1180, and an application layer 1190. The mobile console 1120 may include a software application on a smart phone. The rendered video may be displayed (e.g., shown) on the mobile console 1120. User actions (e.g., jump, shoot) may be conveyed back to the cloud gaming server 1110 (e.g., in the form of commands). Video rendering may be performed at the mobile console 1120.

A console 1130 (e.g., a stationary console) may be between the mobile console 1120 and the cloud gaming server 1110. The console may implement a protocol stack that includes a physical layer 1155, a MAC layer 1165, a network layer 1175, a transport layer 1185, and an application layer 1195. The cloud gaming server 1110 may send instructions to the console 1130 that may render all or part of the video to be displayed on the mobile console 1120. The rendered video (e.g., the fully or partially rendered video) may be sent to the mobile console 1120 together with instructions for video rendering (e.g., in the event of partial rendering). User actions may be conveyed back to the stationary console 1130 or the cloud gaming server 1110. Early packet loss detection may be applied to various wireless transmissions (e.g., the transmission of the commands at the mobile console 1120, the forwarding of the commands at the AP 1140, the transmission of the video at the stationary console 1130, or the forwarding of the video at the AP 1140).

Packet retry limit may be determined based on video gaming traffic differentiation. Video gaming traffic may be differentiated based on a priority assigned to various traffic data. The video gaming traffic may include one or more of the following video, audio, instructions, or commands. There may be two important performance metrics in video gaming (e.g., interaction latency and video quality). Interaction latency may be defined as how soon the game scene responds after a user invokes the control on the console to select an action. Video quality may be characterized by frame rate, resolution, or the like. Video gaming traffic may be prioritized based on assigned priorities in accessing the channel. For example, instructions and commands may be prioritized over audio and video (e.g., in 802.11). A higher priority traffic class may use a larger predetermined (e.g., maximum) retry limit. A higher priority traffic class may use a shorter arbitration inter-frame spacing (AIFS) (e.g., the delay time before accessing the channel). A larger predetermined retry limit and a shorter AIFS may result in reduced interaction latency and improved gameplay.

The combination of early packet loss feedback from the local 802.11 WLAN link and the associated video encoding techniques may prevent prolonged error propagation in the event of packet loss during transmission. The early packet loss detection may be based on current Internet protocols and may overcome challenges presented by packet aggregation, fragmentation, and encryption. The packet loss detection may result in significant improvements in video quality over conventional RTCP roundtrip feedback.

A video encoder may adapt its coding structure upon receiving packet loss notification (e.g., to effectively stop error propagation). The video encoder may encode the video stream based on an identification of a lost video packet. Feedback based video coding techniques (e.g., based on the H.264 encoder) may be used.

Figure 4:
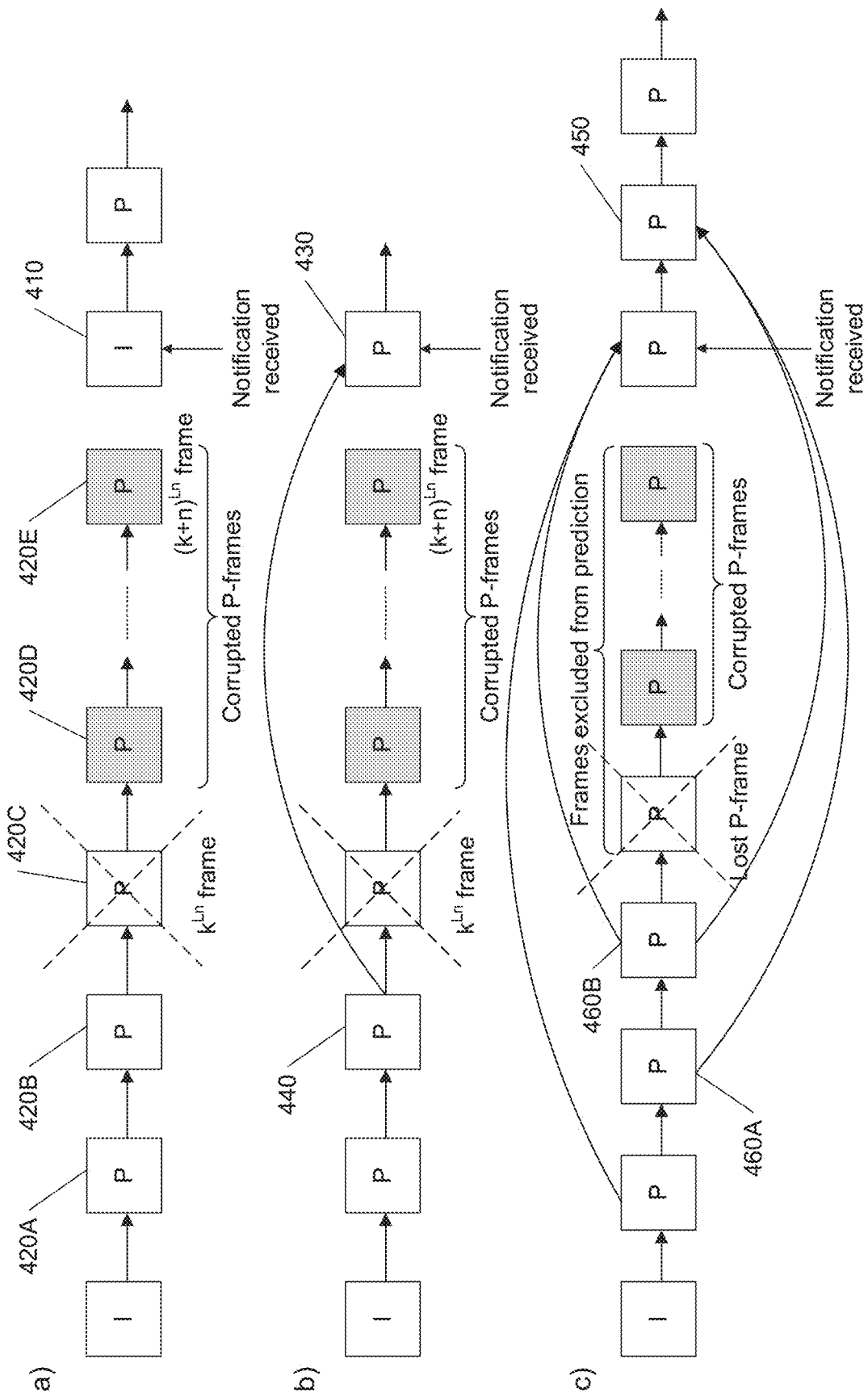
FIG. 4 depicts examples of feedback-based video coding.

FIG. 4(*a*) depicts an example of intra refresh (IR) feedback-based video coding. The encoder may encode a frame 410 (e.g., the next frame) as an intra or instantaneous decoder refresh (IDR) frame (e.g., upon receiving packet loss notification). The intra or IDR frame may break prediction from the previous frames 420A-E.

FIG. 4(*b*) depicts an example of reference picture selection (RPS) based feedback-based video coding. In RPS video coding, the encoder may predict a frame 430 (e.g., the next frame). The predicted frame may be based on a previously transmitted and/or uncorrupted reference frame 440 (e.g., upon receiving packet loss notification). The RPS video coding may use fewer bits than IR coding.

The video encoder may use rate-distortion optimized reference picture selection (RDO-RPS) feedback-based video coding. The video encoder may determine whether to encode a frame as an IDR frame or a predicted frame. The video encoder may use rate-distortion optimization (e.g., to decide between encoding the next frame as an intra/IDR frame or a Predicted (P) frame). The video encoder may encode the frame based on the determination.

FIG. 4(*c*) depicts an example of reference set of picture selection (RSPS) feedback-based video coding. RSPS may be a generalization of the RDO-RPS feedback-based video coding. In RSPS video coding, the video encoder may encode the next frame 450 based on a plurality of previously transmitted and/or uncorrupted reference frames 460. RSPS video coding may reduce the bits required for encoding.

An H.264 encoder may perform (e.g., modified to perform) RDO-RPS. IPPP coding structure may be used (e.g., during encoding). In IPPP coding structure, the first video frame may be encoded as an intra-coded frame and subsequent frames may be encoded as predicted frames. A predicted frame may use the intra-coded frame as a reference frame. The predicted frame may use the intra-coded frame and a predicted frame as reference frames. The JM video decoder may use frame-copy error concealment. For example, a test for quantization parameter (QP)={26, 28, 30, 32, 34}, may use test sequences "News" (352×288, 15 fbs) and "BQMall" (832×480, 30 fps, 300 frames). The News video may be looped back (e.g., looped back repeatedly) to generate, for example, 2236 frames.

Tests for packet error rates (PER)=0.1%, 0.7% and 1.4%, and early notification delays of 60 ms and 120 ms, respectively, may be conducted. Packet error patterns may be obtained (e.g., by adjusting the number of stations attached to an AP to achieve the target PER for a given timeout limit). Early packet loss detection and reporting to RTCP feedback having a feedback delay of 1 second may be compared. For example, in BQMall video, a frame may be encoded as 8 slices (or packets) and use a 120 ms early notification delay. As another example, in News video, a frame may include a packet that may use a 60 ms early notification delay.

Figure 5:
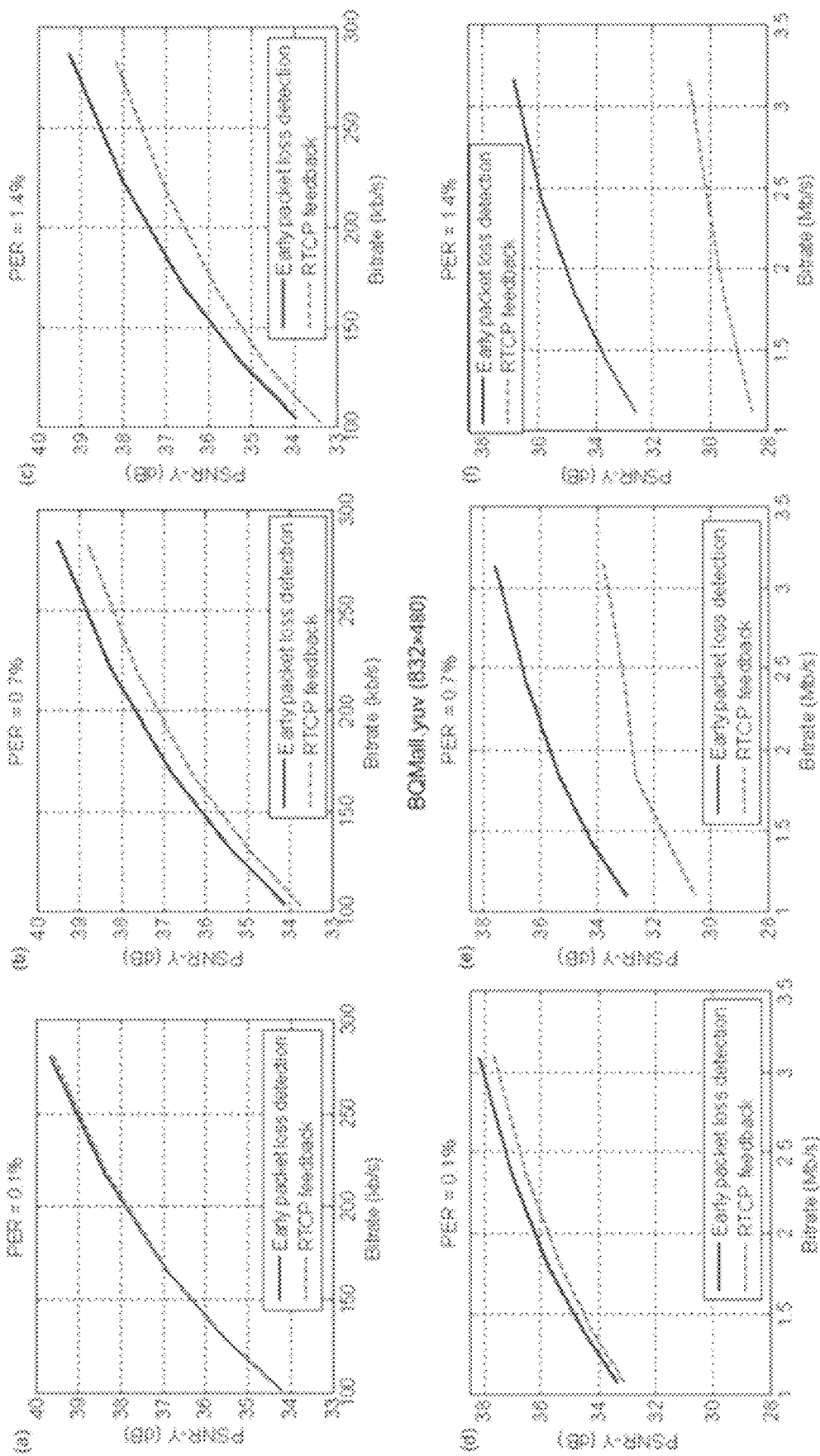
FIG. 5 depicts an example of rate-distortion plots comparing early packet loss detection with real-time transport protocol (RTP) control protocol (RTCP) feedback.
Figure 6:
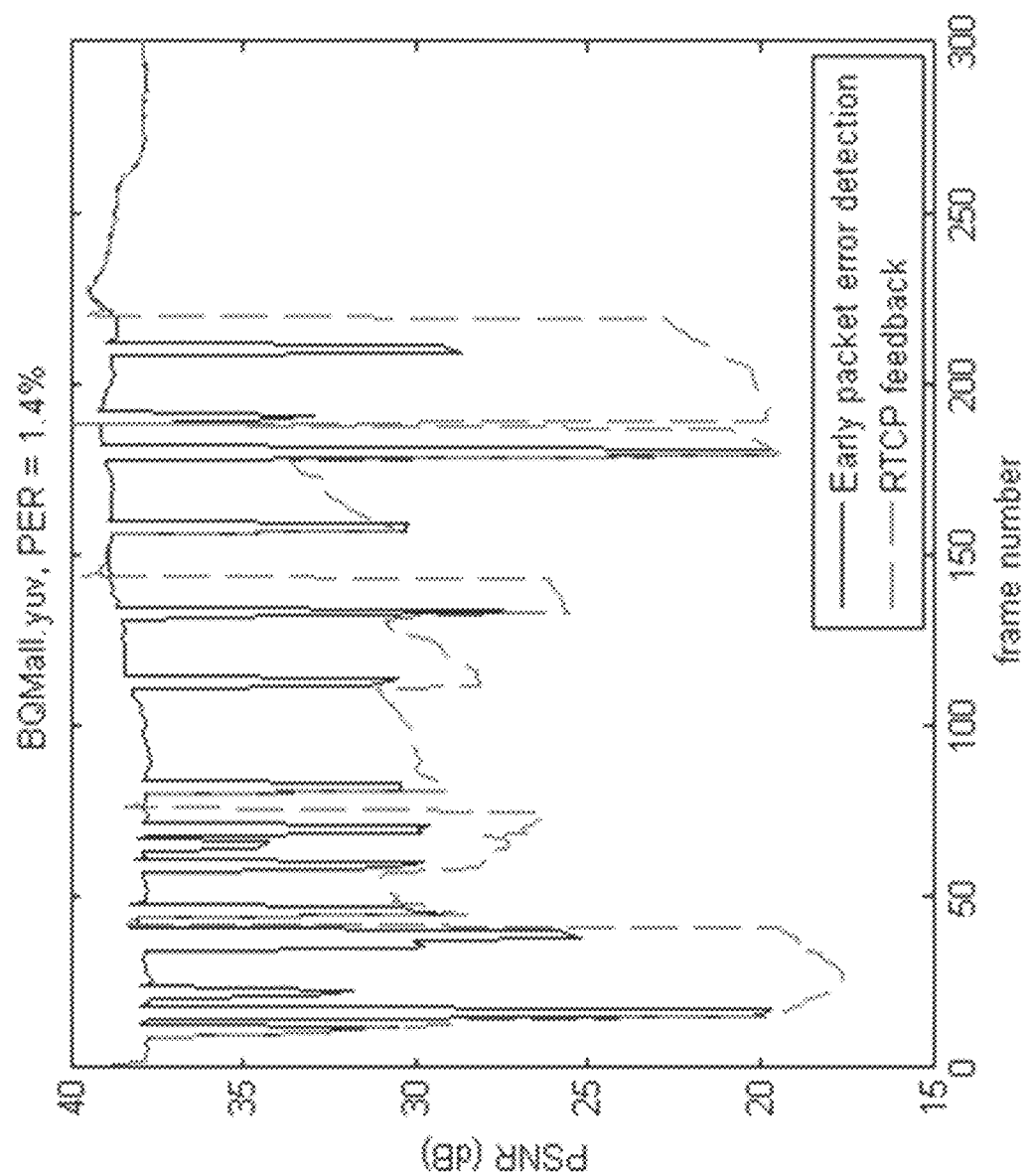
FIG. 6 depicts an example of PSNR-per-frame comparison of a video using early packet error detection and RTCP feedback.

FIG. 5 depicts example rate-distortion (RD) plots for the two sequences at different PER. For example, with News video at very low PER (e.g., PER=0.1%), the RD performance of both the schemes may be similar (e.g., since the video may have relatively low motion). At higher error rates, early packet loss detection may yield up to 0.5-1 dB improvement in PSNR. For example, BQMall video may include a relatively high motion sequence and may contain camera pan and moving people. For BQMall video, early packet loss detection may yield higher RD performance over RTCP feedback for the exemplary PER values, and may yield maximum PSNR gain of 0.5-6 dB. This video may yield lower performance for RTCP feedback since the video has large motion, which may result in higher propagation errors during feedback delay. FIG. 6 depicts an example of PSNR-per-frame for a BQMall video sequence at QP=26 and PER=1.4%.

Packet loss (e.g., early packet loss) may be signaled using MPEG media transport (MMT). Early packet loss signaling using MMT may be agnostic to the transmission layer protocol utilized. For example, early packet loss signaling using MMT may be utilized if the transmission layer protocol is IEEE 802.11 WiFi, IEEE 802.16 WiMAX, 3G, 4G LTE, etc. Early packet loss signaling using MMT may be agnostic to the video codec utilized. For example, early packet loss signaling using MMT may be utilized if the video codec is H.264, HEVC, etc. Early packet loss signaling using MMT may be agnostic to the feedback received.

A communication system may implement an MMT protocol stack. The MMT protocol stack may include at least two layers (e.g., an encapsulation layer and an MMT protocol (MMTP) layer). The encapsulation layer may provide for the mixing of audio, video, and/or other data tracks. The MMTP layer may perform similar to a combination of an RTP layer and an RTCP layer.

FIGS. 12A-D depict example applications of early packet loss signaling using MMT with reference to WiFi and LTE stacks. Although described with reference to WiFi and LTE, early packet loss signaling using MMT may be agnostic to the transmission layer protocol utilized.

Figure 12A:
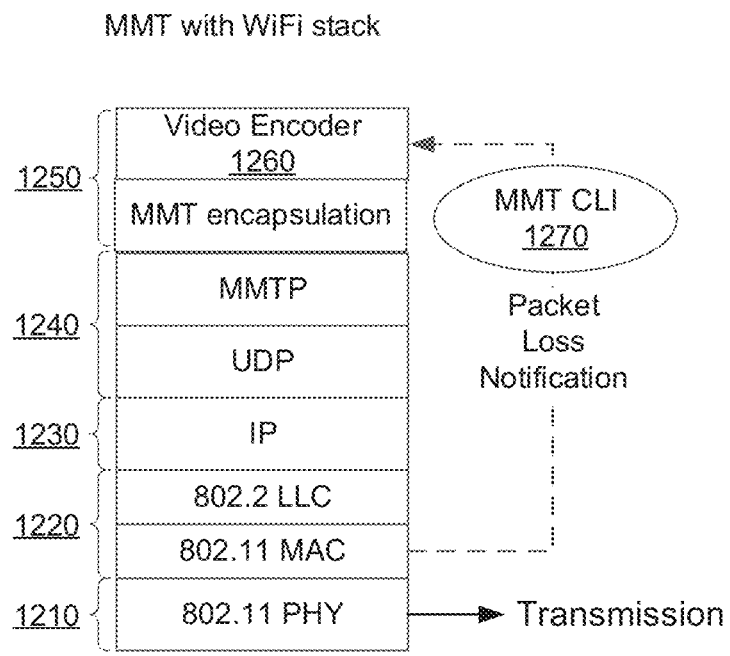
FIGS. 12A-D depict example applications of early packet loss signaling using MMT with reference to WiFi and LTE stacks.

FIG. 12A depicts a diagram of an example MMT communication system within a WiFi protocol stack. For example, the protocol stack of the communication system may include a WiFi physical layer 1210, link layers 1220, an IP network layer 1230, UDP and MMTP transport layers 1240, and/or an application layer 1250. The application layer 1250 may include a video encoder 1260 that may support MMT cross-layer interface (CLI) 1270. Packet transmission failure (e.g., early packet transmission failure) may be determined, for example, at the MAC layer (e.g., 802.11 MAC layer) and may be communicated up to the application 1250 and/or codec layers via a message over an MMT CLI 1270, for example, as depicted in FIG. 12A.

Figure 12C:
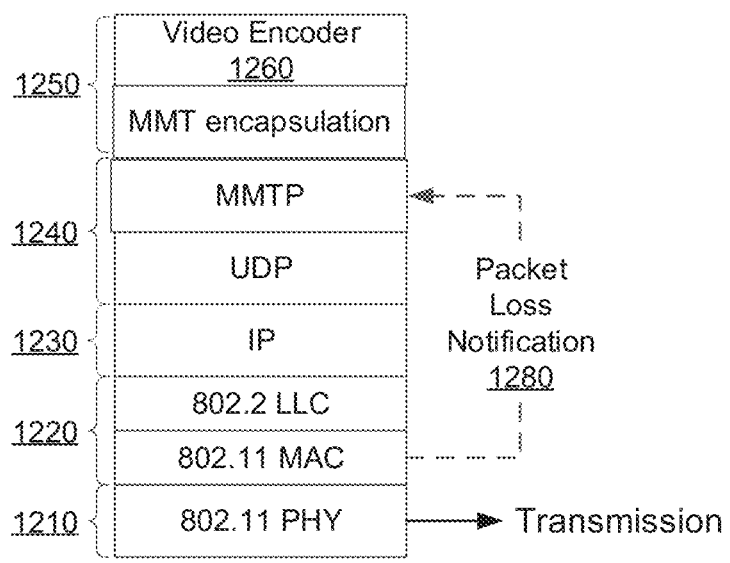

FIG. 12C depicts a diagram of an example MMT communication system within a WiFi protocol stack. For example, the protocol stack of the communication system may include a WiFi physical layer 1210, link layers 1220, an IP network layer 1230, UDP and MMTP transport layers 1240, and/or an application layer 1250. The application layer 1250 may include a video encoder 1260. Packet transmission failure (e.g., early packet transmission failure) may be determined, for example, at the MAC layer (e.g., the 802.11 MAC layer). Packet transmission failure may be communicated via a message up to the MMTP 1240 and/or higher layers. The message may include an MMTP control message 1280 (e.g., a custom MMTP control message), for example, as depicted in FIG. 12C.

Figure 12B:
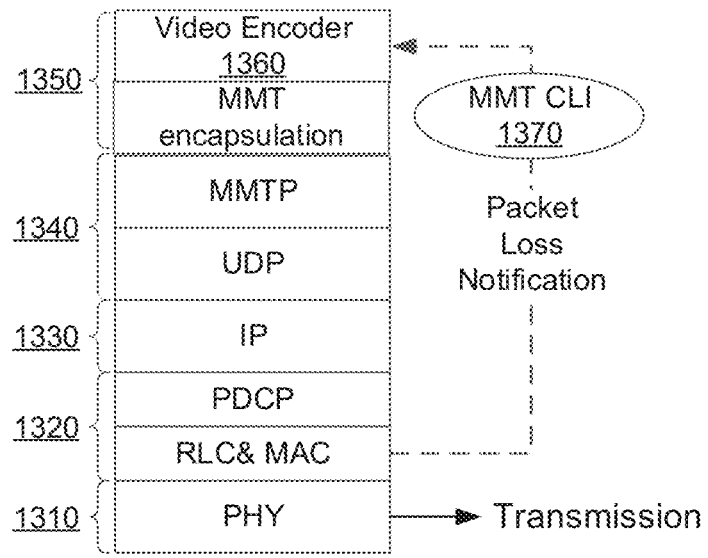

FIG. 12B depicts a diagram of an example MMT communication system within a 4G/LTE protocol stack. For example, the protocol stack of the communication system may include an LTE physical layer 1310, a data link layer 1320, an IP network layer 1330, UDP and MMTP transport layers 1340, and an application layer 1350. The application layer 1350 may include a video encoder 1360 that may support MMT CLI 1370. Packet transmission failure (e.g., early packet transmission failure) may be determined at a data link layer, for example, at an RLC layer (e.g., the LTE RLC layer). Packet transmission failure may be communicated up to the application layer 1350 and/or the codec layer via a message over an MMT CLI 1370, for example, as depicted in FIG. 12B.

Figure 12D:
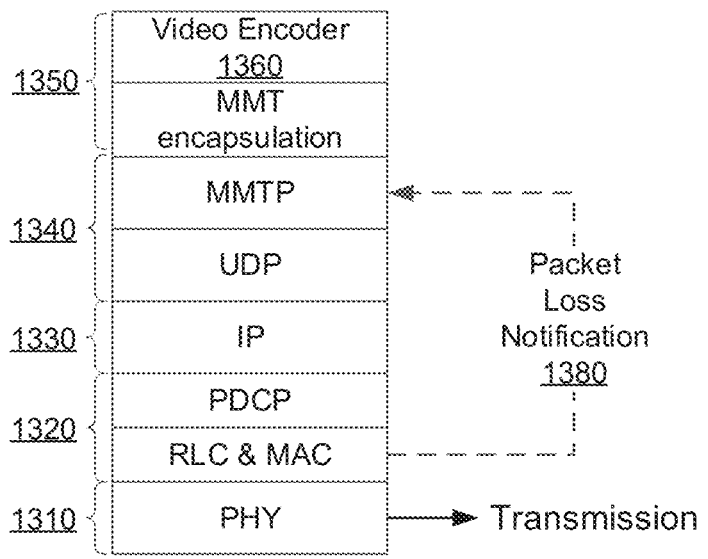

FIG. 12D depicts a diagram of an example MMT communication system within a 4G/LTE protocol stack. For example, the protocol stack of the communication system may include an LTE physical layer 1310, data link layers 1320, an IP network layer 1330, UDP and MMTP transport layers 1340, and an application layer 1350. The application layer 1350 may include a video encoder 1360. Packet transmission failure (e.g., early packet transmission failure) may be determined at a data link layer, for example, at an RLC layer (e.g., an LTE RLC layer). Packet transmission failure may be communicated via a message up to the MMTP transport layers 1340 and/or higher layers. The message may include an MMTP control message 1380 (e.g., a custom MMTP control message), for example, as depicted in FIG. 12D.

An example of an MMT CLI including signaling for individual packet loss from a local link layer may be provided. The CLI may provide the means within an MMT (e.g., a single MMT) entity to support quality of service (QoS) and/or error control. For example, QoS-related information may be exchanged between an application layer and one or more underlying layers (e.g., the MAC/PHY layer). The application layer may provide in formation (e.g., information relating to media characteristics) as top-down QoS information. One or more underlying layers may provide bottom-up QoS information, such as network channel condition, and/or packet-level feedback (e.g., ACK/NACK of individual media fragment units (MFUs)).

CLI may provide an interface (e.g., a unified interface) between the application layer and one or more network layers (e.g., IEEE 802.11 WiFi, IEEE 802.16 WiMAX, 3G, 4G LTE). Network parameters (e.g., common network parameters) of network standards may be abstracted as the NAM parameters for static and dynamic QoS control and feedback of real-time media applications through any network.

MMT may define an interface for exchanging cross layer information between the application layer and one or more underlying network layers. The interface may allow for top-down and/or bottom-up flow of cross layer information. The cross layer information may include QoS, packet-level information, or the like that may be used by the involved functions (e.g., to optimize the overall delivery of the media data). MMT entities may support the interface for cross layer information.

The application layer may provide top-down QoS information to one or more underlying layers. Top-down QoS information may include media characteristics, for example.

Top-down information may include asset level information and/or packet level information, for example. Asset information may be used for capability exchange and/or (re) allocation of resources in one or more underlying layers. Top-down information (e.g., packet level top-down information) may be written in an appropriate field of a packet (e.g., every packet) for one or more underlying layers (e.g., to identify a QoS level to support).

One or more underlying layers may provide bottom-up QoS and/or packet-level in formation to the application layer. Bottom-up QoS information may be about a time-varying network condition. Bottom-up QoS information may enable faster and/or more accurate QoS and/or error control in the application layer. Bottom-up information may be represented as an abstracted fashion (e.g., to support heterogeneous network environments). Bottom-up QoS information may be measured in the underlying layers and may be read by the application layer (e.g., periodically or spontaneously) on request of the MMT application, by one or more underlying delivery layers.

A Network Abstraction for Media (NAM) parameter may be used for an interface between an application layer and one or more underlying layers. NAM may provide a representation (e.g., a unified representation) of network QoS parameters. NAM may communicate with legacy and/or future standards of the one or more underlying layers.

Absolute NAM information may include a QoS value (e.g., a raw QoS value). Absolute NAM information may be measured in an appropriate unit. For example, bitrate may be represented in the unit of bits per second, while jitter may be represented in the unit of seconds.

Encoded frames may be transmitted as encoded units/packets (e.g., several encoded units/packets). Encoded frames may not be transmitted as a single unit/packet. Feedback may be triggered on a per-packet basis.

Syntax of NAM parameters may relate NAM information to MFU feedback NAM information. The CLI information may be exchanged using a NAM parameter and/or a relative NAM parameter. An example of syntax of absolute parameters for NAM is shown in Table 3.

TABLE 3

| Syntax | size (bits) | Mnemonic |
| --- | --- | --- |
| Network Abstraction for Media information { | | |
| CLI_id | 8 | unsigned int |
| available_bitrate | 32 | Float |
| buffer_fullness | 32 | float |
| peak_bitrate | 32 | Float |
| average_bitrate_period | 16 | unsigned int |
| current_delay | 32 | float |
| SDU_size | 32 | unsigned integer |
| SDU_loss_ratio | 8 | unsigned integer |
| generation_time | 32 | unsigned int |
| PER | 32 | float |
| } | | |

An example of syntax of relative parameters for NAM is shown in Table 4.

TABLE 4

| Syntax | size (bits) | Mnemonic |
| --- | --- | --- |
| relative_difference Network Abstraction for Media information ( ) { | | |
| CLI_id | 8 | unsigned integer |
| relative_bitrate | 8 | float |
| relative_buffer_fullness | 8 | float |
| relative_peak_bitrate | 8 | Float |
| average_bitrate_period | 16 | unsigned int |
| current_delay | 32 | float |
| generation_time | 32 | float |
| PER | 32 | float |
| } | | |

Relative NAM information may represent a ratio of expected NAM value to current NAM value. Relative NAM information may be unit-less. Relative NAM information may inform tendency of change.

Packet-level feedback NAM may provide a mechanism for one or more of the underlying layers to report on the delivery of MFUs (e.g., individual MFUs). An ACK may indicate that an MFU has been successfully delivered to the next hop. A NACK may indicate that the MFU has failed to arrive at the next hop.

Timestamp based packet level feedback NAM may be signaled. For example, a sequence number and/or a timestamp may identify the packet and/or MFU. The sequence number and/or the timestamp may be included in the MMTP packet header.

Packet-level delivery feedback request NAM may provide a mechanism for the application layer to query (e.g., actively query) one or more of the underlying layers regarding the delivery of one or more MFUs (e.g., individual MFUs). One or more of the underlying layers may reply with one or more MFU feedback NAMs.

An example syntax of packet-level feedback NAM (e.g., MFU feedback NAM parameter) is shown in Table 5.

TABLE 5

| Syntax | size (bits) | Mnemonic |
| --- | --- | --- |
| Network Abstraction for Media information { | | |
| CLI_id | 8 | unsigned int |
| sequence_number | 32 | unsigned int |
| sequence_number_run_length | 16 | unsigned int |
| delivery_feedback | 8 | unsigned int |
| timestamp | 32 | unsigned int |
| } | | |

An example syntax of single-MFU feedback NAM is shown in Table 6. For example, a single-packet feedback NAM may report the status of a single MFU.

TABLE 6

| Syntax | size (bits) | Mnemonic |
| --- | --- | --- |
| Network Abstraction for Media information { | | |
|   CLI_id | 8 | unsigned int |
|   sequence_number | 32 | unsigned int |
|   delivery_feedback | 8 | unsigned int |
|   timestamp | 32 | unsigned int |
| } | | |

An example syntax of single-MFU implied feedback NAM is shown in Table 7. For example, the implied delivery_feedback may include a NACK.

TABLE 7

| Syntax | size (bits) | Mnemonic |
| --- | --- | --- |
| Network Abstraction for Media information { | | |
|   CLI_id | 8 | unsigned int |
|   sequence_number | 32 | unsigned int |
|   timestamp | 32 | unsigned int |
| } | | |

An example syntax of timestamp-based packet-level feedback NAM is shown in Table 8.

TABLE 8

| Syntax | size (bits) | Mnemonic |
| --- | --- | --- |
| Network Abstraction for Media information { | | |
|   CLI_id | 8 | unsigned int |
|   mfu_timestamp | 32 | unsigned int |
|   mfu_timestamp_duration | 32 | unsigned int |
|   delivery_feedback | 8 | unsigned int |
|   timestamp | 32 | unsigned int |
| } | | |

An example syntax of timestamp-based single-MFU feedback NAM is shown in Table 9.

TABLE 9

| Syntax | size (bits) | Mnemonic |
| --- | --- | --- |
| Network Abstraction for Media information { | | |
|   CLI_id | 8 | unsigned int |
|   mfu_timestamp | 32 | unsigned int |
|   delivery_feedback | 8 | unsigned int |
|   timestamp | 32 | unsigned int |
| } | | |

An example syntax of timestamp-based single-MFU implied feedback NAM is shown in Table 10. For example, the implied delivery_feedback may include a NACK.

TABLE 10

| Syntax | size (bits) | Mnemonic |
| --- | --- | --- |
| Network Abstraction for Media information { | | |
|   CLI_id | 8 | unsigned int |
|   mfu_timestamp | 32 | unsigned int |
|   timestamp | 32 | unsigned int |
| } | | |

An example syntax of delivery feedback request NAM is shown in Table 11.

TABLE 11

| Syntax | size (bits) | Mnemonic |
| --- | --- | --- |
| Network Abstraction for Media information { | | |
|   CLI_id | 8 | unsigned int |
|   sequence_number | 32 | unsigned int |
|   sequence_number_run_length | 16 | unsigned int |
|   timestamp | 32 | unsigned int |
| } | | |

An example syntax of timestamp-based delivery feedback request NAM is shown in Table 12.

TABLE 12

| Syntax | size (bits) | Mnemonic |
| --- | --- | --- |
| Network Abstraction for Media information { | | |
|   CLI_id | 8 | unsigned int |
|   mfu_timestamp | 32 | unsigned int |
|   mfu_timestamp_duration | 32 | unsigned int |
|   timestamp | 32 | unsigned int |
| } | | |

A CLI_id parameter may include an arbitrary integer number. The CLI_id parameter may identify a NAM among the underlying network.

An available_bitrate parameter may include the instantaneous bitrate that the scheduler of the underlying network expects to be available for the MMT stream. The available_bitrate may be expressed in kilobits per second. Overhead for the protocols of the underlying network may not be included in the available_bitrate parameter.

A Buffer_fullness parameter may be utilized to signal the buffer level of the generating function. The buffer may be used to absorb excess data. Excess data may be caused by data rates above the available_bitrate. The buffer_fullness parameter may be expressed in bytes.

A peak_bitrate parameter may include a bitrate (e.g., a maximum allowable bitrate) that the underlying network is able to handle temporarily as input to the MMT stream. The peak_bitrate may be expressed in kilobits per second. Overhead for the protocols of the underlying network may not be included in the peak_bitrate parameter. For example, the MMT input stream bitrate may not exceed the available_bitrate over any period of average_bitrate_period.

An average_bitrage_period parameter may provide the period of time over which the average bitrate of the input stream may be calculated. The average_bitrate_period parameter may be provided in units of milliseconds. For example, if the peak_bitrate flag is set to '1', then the average_bitrage_period field may be set appropriately.

A current_delay parameter may indicate the last measured value of the last hop transport delay. The current_delay parameter may be expressed in milliseconds.

A Service Data Unit (SDU) may include a data unit in which the underlying network delivers the MMT data. An SDU_size parameter may specify the length of the SDU. The SDU_size parameter may be expressed in bits. Overhead for the protocols of the underlying network may not be included in the SDU_size parameter.

An SDU_loss_ratio parameter may include a fraction of SDUs lost and/or detected as erroneous. A loss ratio of MMT packets may be calculated as a function of the SDU_loss_ratio and the SDU_size. The SDU_loss_ratio parameter may be expressed in a percentile.

A generation_time parameter may provide the timestamp of the generation of the current NAM. The generation_time parameter may be expressed in milliseconds. The generation_time may start from an arbitrary value.

A relative_bitrate parameter may include the available_bitrate change ratio (e.g., %). The relative_bitrate parameter may be between the current NAM and the previous NAM parameter.

A relative_buffer_fullness parameter may include the remaining buffer_fullness change ratio (e.g., percentage) between the current NAM and the previous NAM parameter.

A relative_peak_bitrate parameter may include the peak_bitrate change ratio (e.g., percentage) between the current NAM and the previous NAM parameter.

A Packet Error Rate (PER) parameter may include the last measured PER at the PHY and/or MAC layer. For a PER from the PHY layer, the PER parameter may be presented as a positive value. For a PER from the MAC layer, the PER parameter may be presented as a negative value, and the absolute value may be used.

A sequence_number parameter may include the sequence number that identifies an MFU. The sequence_number parameter may include the starting sequence number that may identify a series of MFUs.

A sequence_number_run_length parameter may include the number of MFUs that the feedback applies to. For example, if the sequence_number_run_length parameter is 1, then the feedback may apply to one (e.g., only one) packet.

A delivery_feedback parameter may include the binary feedback information on the MFU and/or MFUs. For example, if the delivery_feedback parameter contains 0s (e.g., all 0s), then the feedback may include a NACK. If the delivery_feedback parameter contains 1s (e.g., all 1s), then the feedback may include an ACK.

A timestamp parameter may be 32 bits. The timestamp parameter may specify the time instance when the feedback is generated. The NTP time may be used in the timestamp, for example, as specified as the "short-format" in clause 6 of IETF RFC5905, NTP version 4.

An mfu_timestamp parameter may include a timestamp that identifies an MFU. The mfu_timestamp parameter may include a starting time that identifies a series of MFUs.

An mfu_timestamp_duration parameter may include the time span of MFUs that the feedback applies to. For example, if the mfu_timestamp_duration parameter is zero, then the feedback may apply to one (e.g., only one) MFU.

The feedback CLI may be generated (e.g., spontaneously) by one or more of the lower layers. The upper layer may query the transmission status of a particular packet and/or a particular set of packets. The status response may be "queued," "in progress," "succeeded," and/or "failed." This query process may utilize additional CLI definitions.

Figure 13A:
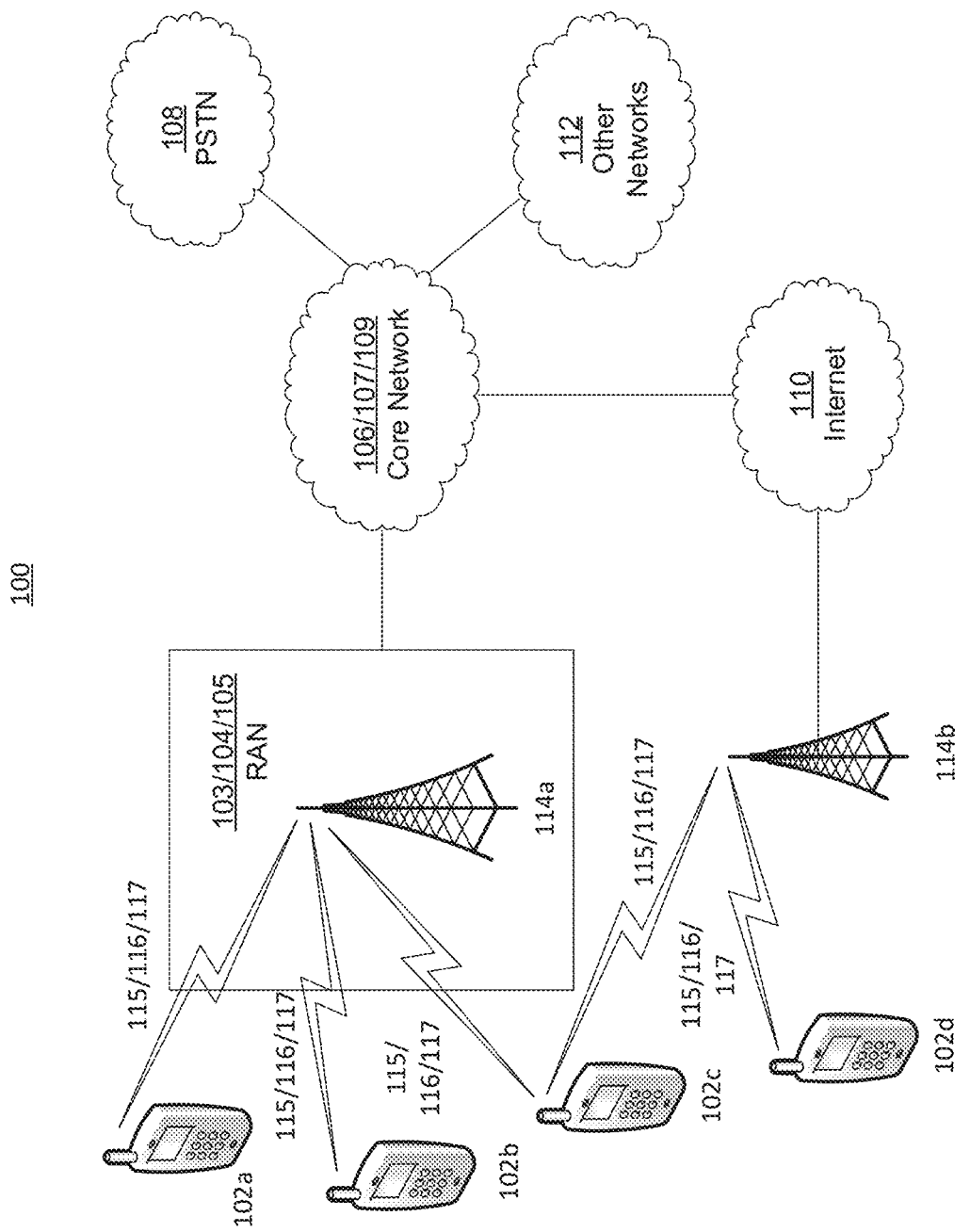
FIG. 13A depicts a system diagram of an example communications system in which one or more disclosed embodiments may be implemented.
Figure 13B:
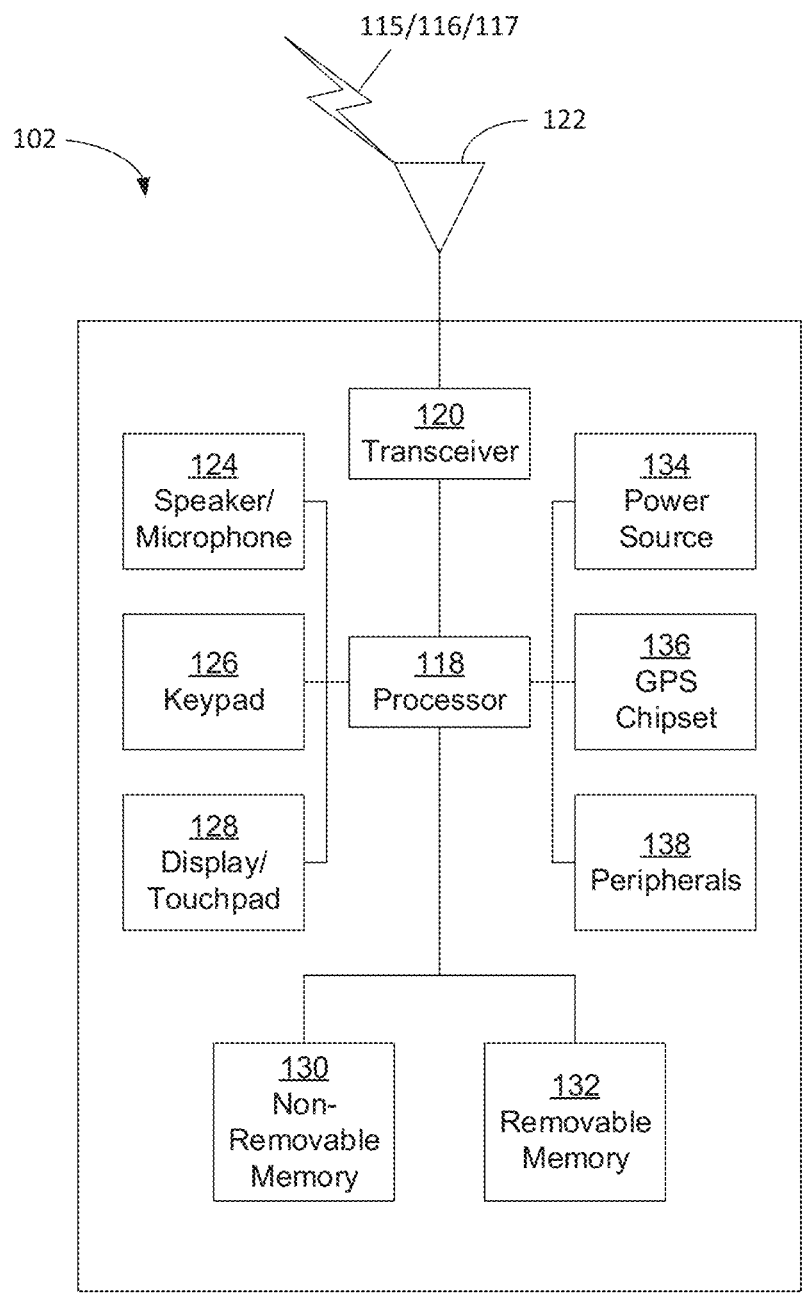
FIG. 13B depicts a system diagram of an example wireless transmit/receive unit (WTRU) that may be used within the communications system depicted in FIG. 13A.

FIG. 13A is a diagram of an example communications system 100 in which one or more disclosed embodiments may be implemented. The communications system 100 may include a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 13A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Inter net 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 13A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 13A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication. Although not shown in FIG. 13A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 13A may be configured to communicate with the base station 114a, which may employ a cellular-based radio technology, and with the base station 114b, which may employ an IEEE 802 radio technology.

FIG. 13B is a system diagram of an example WTRU 102. As shown in FIG. 13B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 13B and described here in.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 13B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 13B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be con figured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access in formation from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be con figured to provide location information (e.g., longitude and latitude) regarding the current location of the WTRU 102. In addition to, or in lieu of, the information from the GPS chipset 136, the WTRU 102 may receive location information over the air interface 115/116/ 117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 13C:
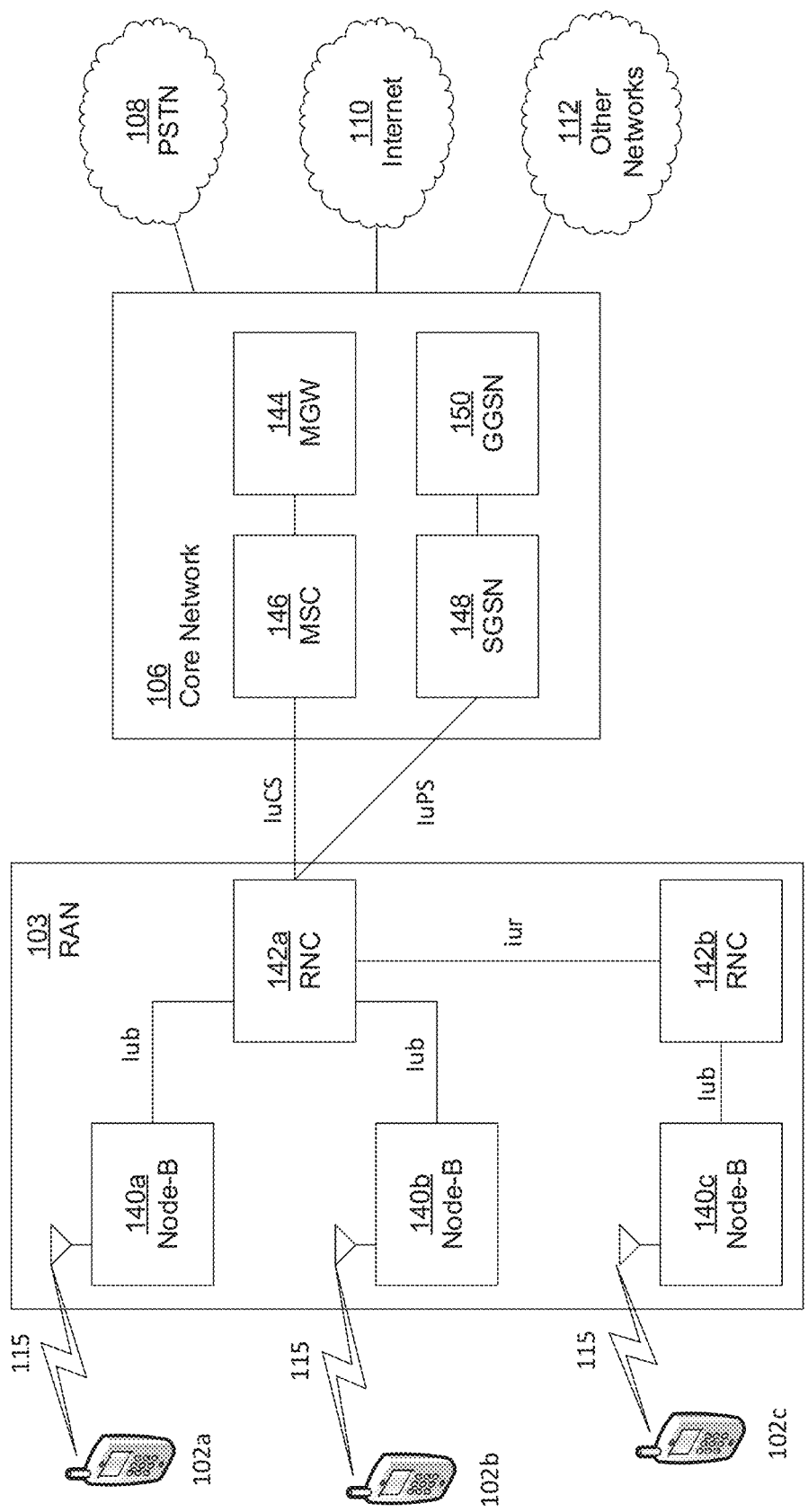
FIG. 13C depicts a system diagram of an example radio access network and an example core network that may be used within the communications system depicted in FIG. 13A.

FIG. 13C is a system diagram of the RAN 103 and the core network 106 according to an embodiment. As noted above, the RAN 103 may employ a UTRA radio technology to communicate with the WTRUs 102a, 102b, and 102c over the air interface 115. The RAN 103 may also be in communication with the core network 106. As shown in FIG. 13C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 13C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 13C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 13D:
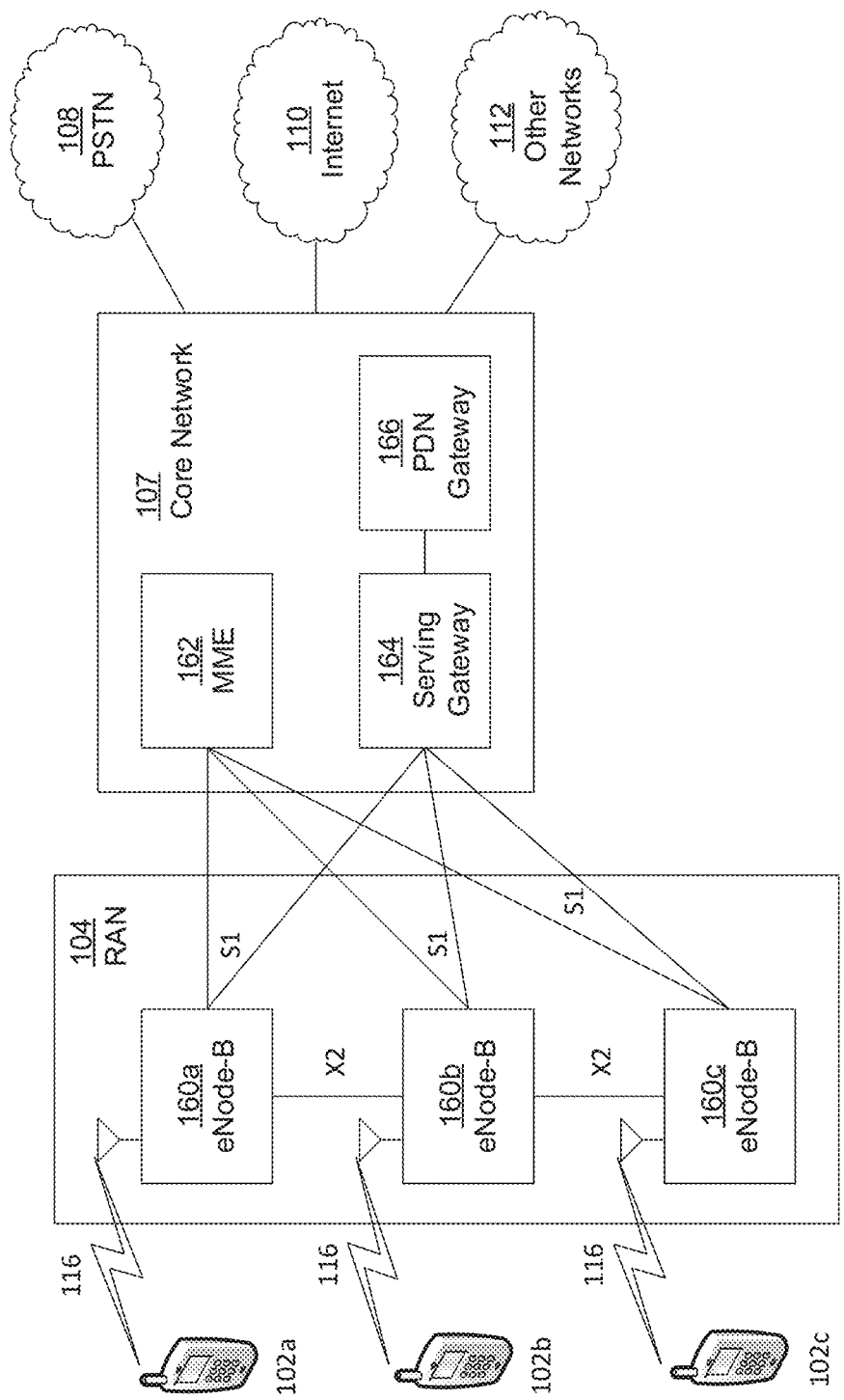
FIG. 13D depicts a system diagram of an example radio access network and an example core network that may be used within the communications system depicted in FIG. 13A.

FIG. 13D is a system diagram of the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink and/or downlink, and the like. As shown in FIG. 13D, the eNode-Bs 160a, 160b, 160c may communicate with one another over an X2 interface.

The core network 107 shown in FIG. 13D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 13E:
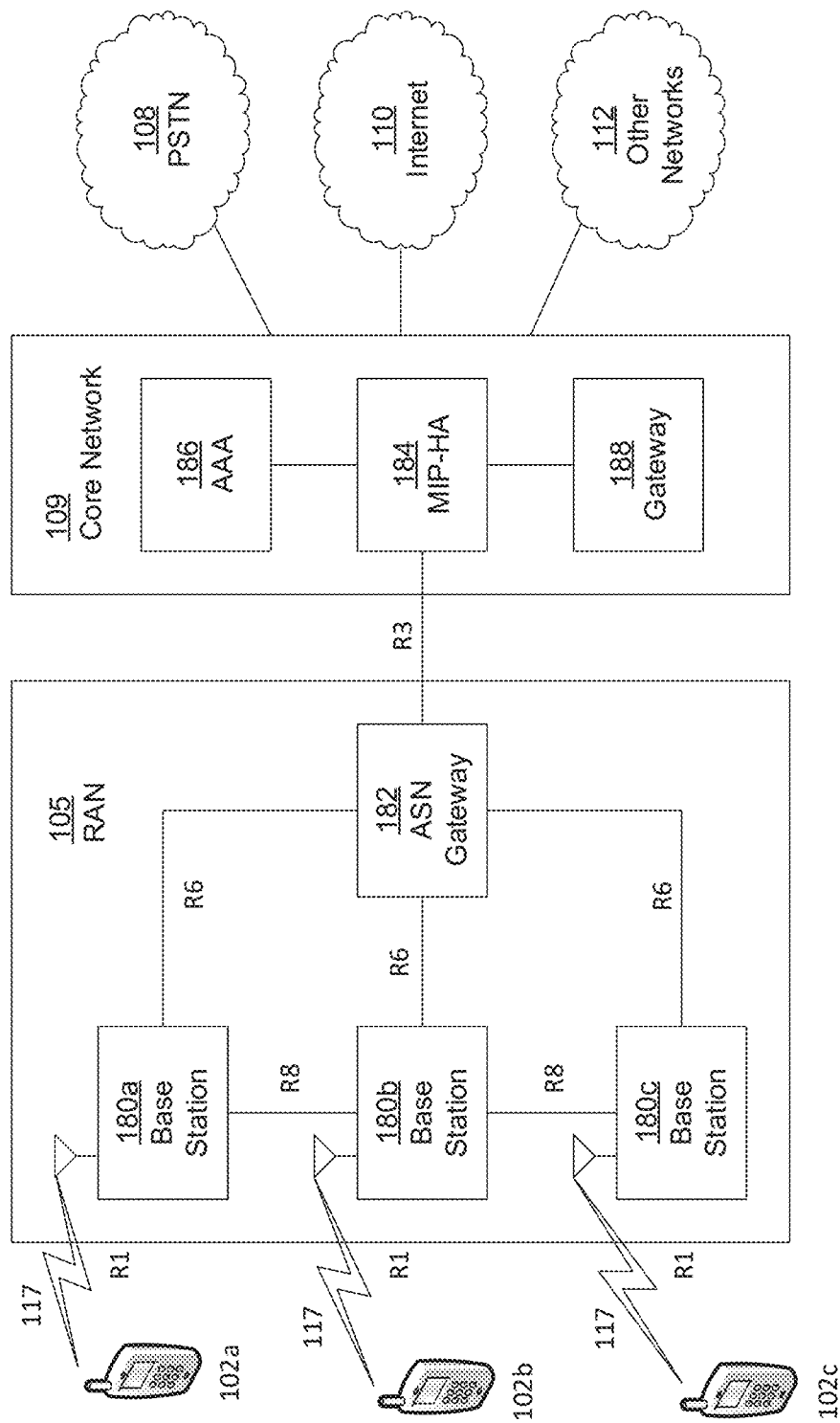
FIG. 13E depicts a system diagram of an example radio access network and an example core network that may be used within the communications system depicted in FIG. 13A.

FIG. 13E is a system diagram of the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 13E, the RAN 105 may include base stations 180a, 180b, 180c, and an ASN gateway 182, though it will be appreciated that the RAN 105 may include any member of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102b, 102c over the air interface 117. In one embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 13E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 13E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

Although features and elements are described above in particular combinations, one of ordinary skill in the art will appreciate that each feature or element may be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, optical media such as CD-ROM disks, and digital versatile disks (DVDs). A processor in association with software may be used to implement a radio frequency transceiver for use in a WTRU, WTRU, terminal, base station, RNC, or any host computer.

What is claimed:

1. A method of packet retransmission, the method comprising:
   a wireless transmit/receive unit (WTRU) sending, at a media access control (MAC) layer, a MAC packet;
   the WTRU determining, at the MAC layer, that a transmission of the MAC packet has failed, wherein the determination that the transmission of the MAC packet has failed is made without receiving feedback from a receiver indicating a packet loss;
   the WTRU determining, based on the determination that the transmission of the MAC packet has failed, whether a cause for the failed transmission of the MAC packet is a channel error or a congestion;
   the WTRU determining a first resend time for the MAC packet on a condition that the determined cause is the channel error;
   the WTRU determining a second resend time for the MAC packet on a condition that the determined cause is the congestion; and
   the WTRU resending, at the MAC layer, the MAC packet based on the first resend time or the second resend time.

2. The method of claim 1, wherein the WTRU determining the cause for the failed transmission comprises:
   the WTRU measuring a channel access delay associated with the MAC layer;
   the WTRU comparing the channel access delay to a predetermined threshold; and
   the WTRU determining the cause to be the congestion on a condition that the channel access delay exceeds the predetermined threshold.

3. The method of claim 1, wherein the determined first resend time is immediate on a condition that the cause for the failed transmission comprises the channel error and the second resend time comprises a retransmission delay time on a condition that the cause for the failed transmission comprises the congestion.

4. The method of claim 3, wherein the retransmission delay time is greater than a packet jitter bound and less than a round trip time.

5. The method of claim 4, further comprising:
   the WTRU determining, at the MAC layer, the round trip time based on a deep packet inspection;
   the WTRU gathering one or more packet delay statistics; and
   the WTRU determining the packet jitter bound based on the one or more packet delay statistics.

6. The method of claim 1, further comprising:
   generating, at the MAC layer of the WTRU, a spoofed NACK that indicates a video packet associated with the failed transmission of the MAC packet; and
   sending the spoofed NACK from the MAC layer to an application layer of the WTRU.

7. The method of claim 1, wherein the WTRU determining that the transmission of the MAC packet has failed comprises the WTRU determining that an acknowledgment (ACK) message, confirming a successful transmission, has not been received after a predetermined number of retransmission attempts.

8. The method of claim 1, wherein the first resend time and the second resend time differ.

9. A wireless transmit/receive unit (WTRU) comprising:
   a processor configured to:
      send, at a media access control (MAC) layer, a MAC packet;
      determine, at the MAC layer, that a transmission of the MAC packet has failed, wherein the determination that the transmission of the MAC packet has failed is made without feedback from a receiver that indicates a packet loss;
      determine, based on the determination that the transmission of the MAC packet has failed, whether a cause for the failed transmission of the MAC packet is a channel error or a congestion;
      determine a first resend time for the MAC packet on a condition that the determined cause is the channel error;
      determine a second resend time for the MAC packet on a condition that the determined cause is the congestion; and
      resend, at the MAC layer, the MAC packet based on the first resend time or the second resend time.

10. The WTRU of claim 9, wherein the processor being configured to determine the cause for the failed transmission comprises being further configured to:
    measure a channel access delay associated with the MAC layer;
    compare the channel access delay to a predetermined threshold; and
    determine the cause to be the congestion on a condition that the channel access delay exceeds the predetermined threshold.

11. The WTRU of claim 9, wherein the determined first resend time is immediate on a condition that the cause for the failed transmission comprises the channel error and the second resend time comprises
    a retransmission delay time on a condition that the cause for the failed transmission comprises the congestion.

12. The WTRU of claim 11, wherein the retransmission delay time is greater than a packet jitter bound and less than a round trip time.

13. The WTRU of claim 12, wherein the processor is further configured to:
   determine, at the MAC layer, the round trip time based on a deep packet inspection;
   gather one or more packet delay statistics; and
   determine the packet jitter bound based on the one or more packet delay statistics.

14. The WTRU of claim 9, wherein the processor is further configured to:
   generate, at the MAC layer of the WTRU, a spoofed NACK that indicates a video packet associated with the failed transmission of the MAC packet; and
   send the spoofed NACK from the MAC layer to an application layer of the WTRU.

15. The WTRU of claim 9, wherein the processor configured to determine that the transmission of the MAC packet has failed comprises being configured to determine that an acknowledgment (ACK) message, that confirms a successful transmission, has not been received in a predetermined period of time.

16. The WTRU of claim 9, wherein the processor configured to determine that the transmission of the MAC packet has failed comprises being further configured to determine that an acknowledgment (ACK) message, that confirms a successful transmission, has not been received after a predetermined number of retransmission attempts.

17. The WTRU of claim 9, wherein the processor is further configured to:
   generate, at the MAC layer, a message that indicates the failed transmission of the MAC packet; and
   send the message from the MAC layer to an application layer.

18. A wireless transmit/receive unit (WTRU) comprising:
   a processor configured to:
      send, at a media access control (MAC) layer, a MAC packet;
      determine, at the MAC layer of the WTRU, that an acknowledgment (ACK) message associated with the MAC packet has not been received after a predetermined number of retransmission attempts;
      determine, at the MAC layer of the WTRU based on the ACK message not being received after the predetermined number of retransmission attempts, that a transmission of the MAC packet has failed, wherein the determination that the transmission of the MAC packet has failed is made without feedback from a receiver that indicates a packet loss;
      determine, based on the determination that the transmission of the MAC packet has failed, whether a cause for the failed transmission of the MAC packet is a channel error or a congestion;
      determine a first resend time for the MAC packet on a condition that the determined cause is the channel error;
      determine a second resend time for the MAC packet on a condition that the determined cause is the congestion; and
      resend, at the MAC layer, the MAC packet based on the first resend time or the second resend time.

19. The WTRU of claim 18, wherein the processor is further configured to identify a video packet associated with the failed transmission of the MAC packet and encode a video stream based on the identified video packet.

* * * * *